(12) United States Patent
Yamamoto et al.

(10) Patent No.: US 10,464,601 B2
(45) Date of Patent: Nov. 5, 2019

(54) AUTOMATIC TILTING VEHICLE

(71) Applicant: TOYOTA JIDOSHA KABUSHIKI KAISHA, Toyota-shi, Aichi (JP)

(72) Inventors: Junrou Yamamoto, Susono (JP); Toshihide Yano, Susono (JP); Yukihide Kimura, Gotenba (JP); Taku Nagasawa, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 143 days.

(21) Appl. No.: 15/899,401

(22) Filed: Feb. 20, 2018

(65) Prior Publication Data
US 2018/0237065 A1 Aug. 23, 2018

(30) Foreign Application Priority Data

Feb. 22, 2017 (JP) ................................. 2017-031258

(51) Int. Cl.
*B62D 9/02* (2006.01)
*B60G 21/00* (2006.01)
(Continued)

(52) U.S. Cl.
CPC ................ *B62D 9/02* (2013.01); *B60G 3/20* (2013.01); *B60G 17/0162* (2013.01); *B60G 21/005* (2013.01); *B60G 21/007* (2013.01); *B60K 1/00* (2013.01); *B60G 2300/122* (2013.01); *B60G 2300/45* (2013.01); *B60K 7/0007* (2013.01);
(Continued)

(58) Field of Classification Search
CPC .......... B62D 9/02; B60K 1/00; B60K 7/0007; B60K 2007/0038; B60G 3/20; B60G 17/0162; B60G 21/007; B60G 21/005; B60G 2300/45; B60G 2300/122; B60Y 2200/122

See application file for complete search history.

(56) References Cited

U.S. PATENT DOCUMENTS 4,844,506 A * 7/1989 Moriguchi ......... B60G 17/0162
280/5.51
4,937,748 A * 6/1990 Yonekawa ......... B60G 17/0162
280/5.508
(Continued)

FOREIGN PATENT DOCUMENTS

JP 2015-056989 A 3/2015
WO 2012/049724 A1 4/2012
(Continued)

*Primary Examiner* — Karen Beck
(74) *Attorney, Agent, or Firm* — Oliff PLC

(57) ABSTRACT

Automatic tilting vehicle is provided that includes left and right front wheels supported by knuckles, a rear wheel steered by a steering actuator, a vehicle tilting device, and a control unit. The control unit calculates a target tilt angle of the vehicle and a target steered angle of the rear wheel based on a steering angle and a vehicle speed, controls the vehicle tilting device so that a tilt angle of the vehicle becomes the target tilt angle, and controls the steering actuator so that a steered angle of the rear wheel becomes the target steered angle. When the vehicle is turning and decelerating, a steered angle of the rear wheel is controlled not to be the target steered angle but to zero, and a tilt angle of the vehicle is reduced by a gyro moment of the rear wheel.

6 Claims, 11 Drawing Sheets

(51) Int. Cl.
*B60G 17/016* (2006.01)
*B60G 3/20* (2006.01)
*B60K 1/00* (2006.01)
*B60K 7/00* (2006.01)

(52) U.S. Cl.
CPC . *B60K 2007/0038* (2013.01); *B60Y 2200/122* (2013.01)

(56) References Cited

U.S. PATENT DOCUMENTS

| | | |
|---|---|---|
| 2013/0193656 A1 | 8/2013 | Itoh et al. |
| 2018/0147908 A1* | 5/2018 | Kameda ............. B60G 17/0182 |
| 2018/0264905 A1* | 9/2018 | Kimura ............. B60G 17/0182 |
| 2018/0265158 A1* | 9/2018 | Hara ........................ B62K 5/08 |
| 2018/0334001 A1* | 11/2018 | Kato ........................ B60G 3/20 |

FOREIGN PATENT DOCUMENTS

| | | | |
|---|---|---|---|
| WO | WO-2015028767 A1 * | 3/2015 | ............... B60G 3/20 |
| WO | WO-2018181750 A1 * | 10/2018 | |

* cited by examiner

AUTOMATIC TILTING VEHICLE

CROSS-REFERENCE TO RELATED APPLICATION

The disclosure of Japanese Patent Application NO. JP2017-31258 filed on Feb. 22, 2017 is incorporated by reference in its entirety.

BACKGROUND

1. Technical Field

The present disclosure relates to an automatic tilting vehicle that automatically tilts (self inclines) to the inside of a turn when turning.

2. Description of the Related Art

An automatic tilting vehicle has a vehicle tilting device, and the vehicle is automatically tilted to the inner side of a turn by the vehicle tilting device at the time of turning. For example, International Publication No. 2012/049724 describes an automatic tilting vehicle that includes a pair of front wheels (non-steered wheels) spaced laterally, a rear wheel (a steered wheel), a vehicle tilting device, and a control unit that controls the vehicle tilting device, and the pair of front wheels are rotatably supported by corresponding knuckles. The vehicle tilting device is a swing type vehicle tilting device and includes a swing member swingable about a swing axis extending in a longitudinal direction of the vehicle, a tilt actuator that swings the swing member about the swing axis, and a pair of tie rods. The pair of tie rods are integrally connected at the lower ends to the corresponding knuckles and pivotally connected at the upper ends to outer ends of the swing member on both lateral sides with respect to the swing axis. Each tie rod includes a shock absorber and a suspension spring.

When the swing member swings about the pivot axis, the pair of tie rods vertically move in opposite directions to each other, so that the front wheels move up and down in opposite directions relative to a vehicle body, thereby the vehicle inclines in a lateral direction. The control unit calculates a target tilt angle of the vehicle for stably turning the vehicle based on a steering operation amount of the driver and a vehicle speed and controls a swing angle of the swing member by the tilt actuator so as to tilt the vehicle so that a tilt angle of the vehicle conforms to the target tilt angle.

It is preferable that a tilt angle of the vehicle is controlled without delay in accordance with a driving operation of a driver. Consequently a target tilt angle of the vehicle is calculated, for example, so that a centrifugal force acting on the center of gravity of the vehicle based on a steering operation amount of the driver and a vehicle speed is estimated, and a resultant force of the estimated centrifugal force and the gravity acts in a predetermined direction. For example, a target lateral acceleration of the vehicle is calculated based on a steering operation amount of the driver and a vehicle speed, and a target tilt angle of the vehicle is calculated based on the ratio of the target lateral acceleration of the vehicle to the gravitational acceleration. It is also preferable that a steered angle of the rear wheel be controlled without delay in accordance with a driving operation of the driver. Therefore, for example, a target steered angle of the rear wheel is calculated based on a target lateral acceleration of the vehicle and a vehicle speed, and the steered angle of the rear wheel is controlled to be the target steered angle by a steering actuator.

SUMMARY

When the automatic tilting vehicle is decelerated during cornering, ground loads of the front wheels, which are non-steerable wheels, increase due to a load movement in the front and rear direction, and a ground load of the rear wheel, which is a steered wheel, decreases. Therefore, an actual lateral acceleration of the vehicle decreases due to the decrease in a turning lateral force of the vehicle, and a target lateral acceleration of the vehicle becomes excessive as compared with the actual lateral acceleration, so that a target tilt angle of the vehicle calculated based on a target lateral acceleration and a vehicle speed tends to be excessive. When a target tilt angle of the vehicle becomes excessive, even if the tilt actuator is controlled so that the tilt angle of the vehicle becomes the target tilt angle, since an actual tilt angle of the vehicle becomes larger than a preferable angle, it is impossible to control the tilt angle of the vehicle to an tilt angle suitable for the running condition of the vehicle.

The present disclosure provides an automatic tilting vehicle improved to reduce the possibility of an excessive tilt of the vehicle and to enhance the controllability of the tilt angle of the vehicle at the time of turning deceleration as compared with the prior art by reducing a tilt angle of the vehicle by effectively utilizing a gyro moment acting on the rear wheel during turning deceleration of the automatic tilting vehicle.

According to the present disclosure, an automatic tilting vehicle is provided which includes a pair of laterally spaced front wheels, a rear wheel configured to be steered by a steering actuator, a vehicle tilting device, and a control unit; each front wheel is rotatably supported by a corresponding knuckle; the vehicle tilting device includes a swing member that swings about a swing axis extending in the longitudinal direction of the vehicle, a tilt actuator that swings the swing member about the swing axis, and a pair of tie rods pivotally attached to the swing member at upper end pivoting portions on both lateral sides of the vehicle and coupled to corresponding knuckles at lower end coupling portions; the tilt actuator is coupled to a vehicle body via a suspension spring; the control unit is configured to calculate a target steered angle of the rear wheel based on a steering operation amount of a driver and a vehicle speed and to control the steering actuator so that a steered angle of the rear wheel becomes the target steered angle; further, the control unit is configured to calculate a target lateral acceleration of the vehicle based on a steering operation amount of the driver and a vehicle speed, to calculate a target tilt angle of the vehicle based on the target lateral acceleration of the vehicle, and to tilt the vehicle to a turning inner side by controlling the tilt actuator such that a tilt angle of the vehicle becomes the target tilt angle.

The control unit is configured to control the steering actuator such that when it is determined that the vehicle is turning and a ground load of the rear wheel is decreased due to deceleration of the vehicle, a steered angle of the rear wheel becomes smaller than the target steered angle.

As will be described in detail later, when the automatic tilting vehicle is tilted to the inner side of a turn when turning, the left and right front wheels and rear wheel are inclined in a state of being rotated together with the vehicle body. As a result, a gyro moment acts on each wheel so as to return its position to the position in the standard state as in the straight running of the vehicle. Forces caused by the gyro moments acting on the front wheels and the rear wheel are transmitted to the vehicle body via the suspensions of the front wheels and the rear wheel, respectively. Therefore, the vehicle body receives a force toward the outside of the turn, and the force acts to reduce the tilt angle of the vehicle.

As described above, when the automatic tilting vehicle is decelerated at the time of turning, an actual lateral acceleration of the vehicle decreases and a target lateral acceleration of the vehicle becomes excessive as compared with the actual lateral acceleration. Therefore, the target tilt angle of the vehicle to be calculated based on the target lateral acceleration and a vehicle speed is liable to become excessive. When the target tilt angle of the vehicle becomes excessive, even if the tilt actuator is controlled so that a tilt angle of the vehicle becomes the target tilt angle, the actual tilt angle of the vehicle becomes larger than a preferable angle.

According to the above configuration, when it is determined that the vehicle is turning and a ground load of the rear wheel is decreased due to deceleration of the vehicle, the steering actuator is controlled so that the steered angle of the rear wheel is set to be smaller than the target steered angle. If the steered angle of the rear wheel is made small, the action direction of the force due to the gyro moment acting on the rear wheel approaches the lateral direction of the vehicle as viewed from above the vehicle, so that an action of reducing the tilt angle of the vehicle can be increased. Therefore, as compared to where the steered angle of the rear wheel is not reduced, it is possible to reduce a tilt angle of the vehicle so as to be close to a preferable angle suitable for a running condition of the vehicle and to improve the controllability of the tilt angle of the vehicle at the time of turning deceleration as compared with the prior art.

In a situation where a vehicle is turning and a ground load of the rear wheel is decreased due to deceleration of the vehicle, a lateral force of the rear wheel decreases and the vehicle is in a state close to straight running. Therefore, even if the rear wheel are steered such that a steered angle of the rear wheel becomes smaller than a target steered angle, the running behavior of the vehicle is not substantially affected.

In another aspect of the present disclosure, the control unit is configured to control the steering actuator so that, when a deceleration of the vehicle becomes equal to or higher than a first reference value, a steered angle of the rear wheel becomes smaller than the target steered angle until a deceleration of the vehicle becomes less than a second reference value smaller than the first reference value.

According to the above aspect, when a deceleration of the vehicle becomes equal to or higher than the first reference value, a steered angle of the rear wheel can be reliably made smaller than the target steered angle until a deceleration of the vehicle becomes smaller than the second reference value. Therefore, the tilt angle of the vehicle can be surely reduced during the above-mentioned period of time and can be brought close to a preferable angle suitable for the running condition of the vehicle.

Furthermore, according to the above aspect, when a deceleration of the vehicle decreases to a value less than the second reference value, the steered angle of the rear wheel is not made smaller than the target steered angle. Therefore, in a situation where the vehicle is turning and a ground load of the rear wheel is restored due to the reduction in the deceleration of the vehicle, the steered angle of the rear wheel can be prevented from becoming unnecessarily smaller than the target steered angle.

In another aspect of the present disclosure, the steering actuator is an electric actuator, and the control unit is configured to determine that a ground load of the rear wheel has decreased when a control current supplied to the steering actuator is equal to or less than a reference current determined based on the target steered angle and a vehicle speed.

Since a self-aligning torque acts on the rear wheel when the rear wheel is steered, the steering actuator must steer the rear wheel against the self-aligning torque to control a steered angle of the rear wheel to the target steered angle. Accordingly, a control current supplied to the steering actuator varies according to the self-aligning torque. Therefore, when a ground load of the rear wheel decreases due to deceleration of the vehicle, the self-aligning torque also decreases and the control current also decreases. Thus, the control current functions as an index value of the ground load of the rear wheel during turning deceleration of the vehicle.

A self-aligning torque of the rear wheel can be estimated based on a steered angle of the rear wheel and a vehicle speed. By using the target steered angle of the rear wheel instead of a steered angle of the rear wheel, it is possible to estimate the self-aligning torque of the rear wheel without delay and it is possible to eliminate the need for a device for detecting a steered angle of the rear wheel.

According to the above aspect, a control current supplied to the steering actuator is determined based on the target steered angle and a vehicle speed, and when the control current is equal to or less than a reference current determined on the basis of the target steered angle and a vehicle speed, it is determined that a ground load of the rear wheel is decreased. Therefore, it is possible to determine the situation in which a ground load of the rear wheel has decreased, without requiring a device for detecting a ground load of the rear wheel and a device for detecting a steered angle of the rear wheel.

Furthermore, in another aspect of the present disclosure, the control unit is configured to control the steering actuator so that a steered angle of the rear wheel becomes zero when it is determined that the vehicle is turning and a ground load of the rear wheel is decreased due to deceleration of the vehicle.

As will be described in detail later, when an action direction of a force caused by a gyro moment acting on the rear wheel is the lateral direction of the vehicle as viewed from above the vehicle, that is, when the steered angle of the rear wheel is zero, the effect in which the force reduces a tilt angle of the vehicle becomes the largest. Therefore, it is preferable that a steered angle of the rear wheel is set to zero.

According to the above aspect, the steering actuator is controlled so that a steered angle of the rear wheel becomes zero. Therefore, since a tilt angle of the vehicle can effectively be reduced as compared to where the steering actuator is controlled so that a steered angle of the rear wheel is smaller than the target steered angle and larger than zero, the controllability of the tilt angle of the vehicle at the time of turning deceleration can be effectively improved.

Other objects, other features and attendant advantages of the present disclosure will be readily understood from the description of the embodiments of the present disclosure described with reference to the following drawings. It is to be noted that in the present application, "longitudinal direction" and "lateral direction" are a longitudinal direction of the vehicle and a lateral direction of the vehicle, respectively, and "front" and "rear" are front and rear in the longitudinal direction of the vehicle, respectively.

DETAILED DESCRIPTION

An embodiment of the present disclosure will now be described in detail with reference to the accompanying drawings.

In FIGS. 1 to 4, an automatic tilting vehicle 10 according to an embodiment of the present disclosure is a tricycle vehicle with a capacity of one which includes a pair of front wheels 12L and 12R that are non-steered drive wheels, and a rear wheel 14 that is a steered driven wheel. The front wheels 12L and 12R are spaced apart from each other in the lateral direction and are rotatably supported about rotation axes (not shown) by corresponding knuckles (wheel carriers) 16L and 16R.

Figure 1:
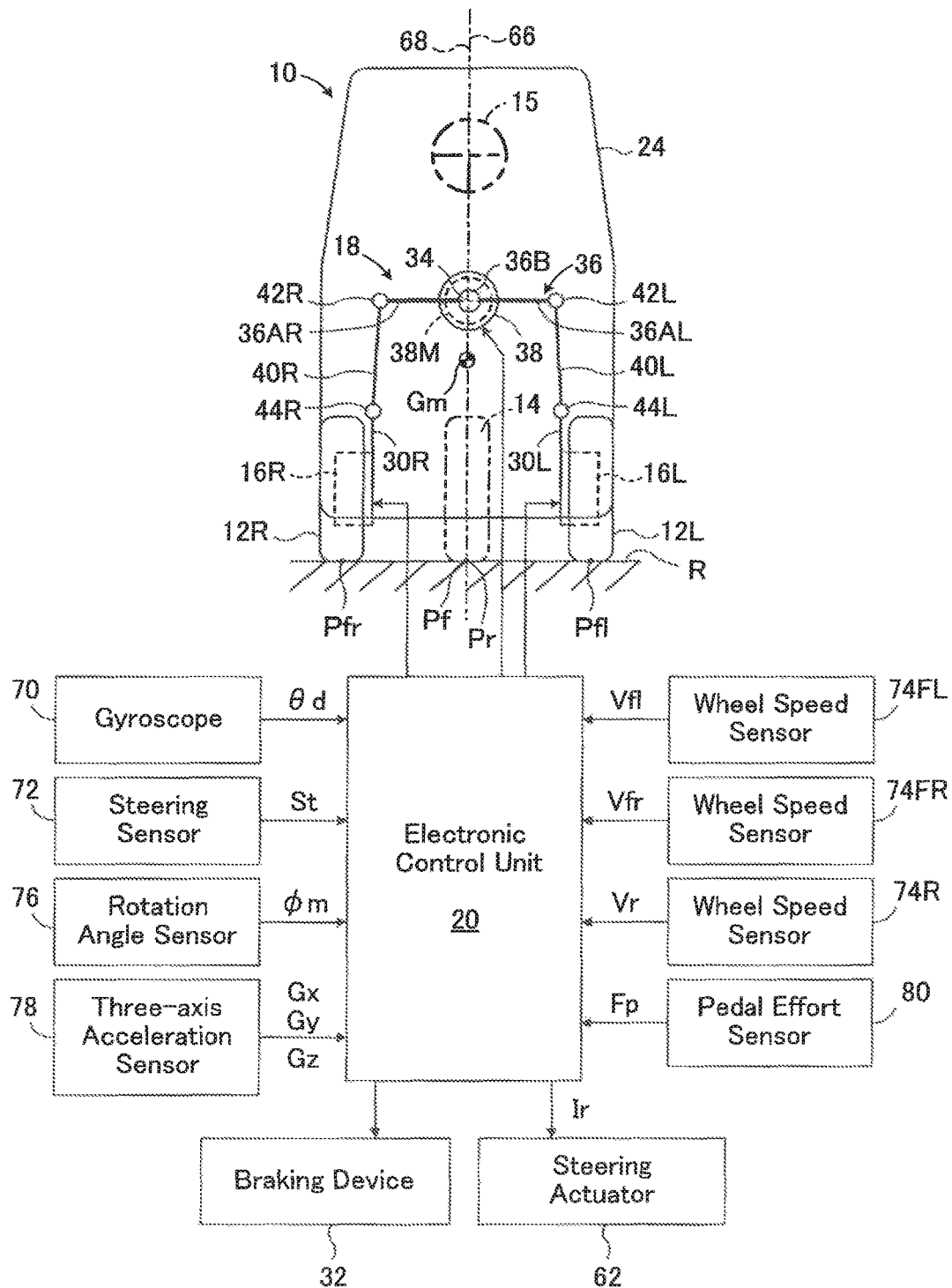
FIG. 1 is a schematic front vertical cross-sectional view showing an embodiment of an automatic tilting vehicle according to the present disclosure.
Figure 6:
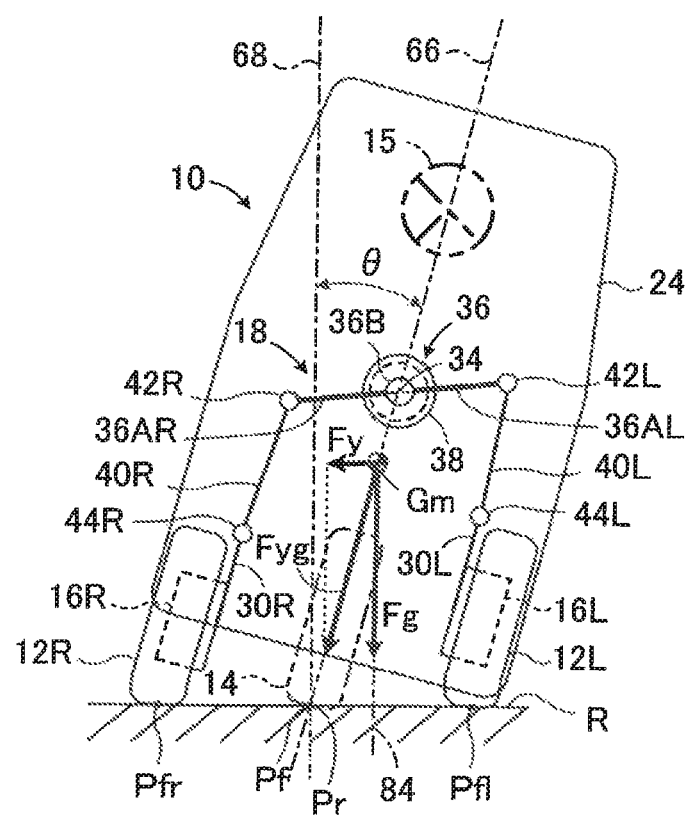
FIG. 6 is a front longitudinal cross-sectional view showing the embodiment in the case of the left turning being cut along a lateral vertical cutting plane in the front wheel position.

In the embodiment, a camber of the front wheels 12L and 12R is a neutral camber, so that a camber angle of the front wheels at the time of non-cornering of the vehicle 10 is zero. It should be noted that the camber of the front wheels may be a negative camber or a positive camber. The rear wheel 14 is located rearward of the front wheels and steered in a steer-by-wire manner according to an amount of operation of a steering wheel 15 by a driver, as will be described in detail later. In FIG. 1 and FIG. 6 described below, the steering wheel 15 is shown at a position different from an actual position. The automatic tilting vehicle 10 further includes a vehicle tilting device 18 and an electronic control unit 20.

In the illustrated embodiment, the knuckles 16L and 16R each incorporate an in-wheel motor as a driving device, which is not shown in the figure. The knuckles 16L and 18R are supported by corresponding suspension arms 22L and 22R so as to be vertically displaceable with respect to a vehicle body 24 and to restrict lateral displacement and inclination with respect to the vehicle body 24.

The Illustrated suspension arms 22L and 22R are leading arms that are integrally connected to the knuckles 16L and 16R at their front ends, respectively, and are connected at their rear ends to the vehicle body 24 by joints 28L and 28R, respectively. The joints 28L and 28R may be joints such as rubber bushing devices having axes extending substantially in the lateral direction. As long as the above requirements relating to the knuckles 16L and 16R are satisfied, the suspension arms 22L and 22R may be other arms such as trailing arms or a combination of upper and lower arms.

The lower ends of the knuckle arms 30L and 30R are integrally connected to the vicinities of the front ends of the suspension arms 22L and 22R, respectively. The knuckle arms 30L and 30R extend substantially in the upward direction from the suspension arms 22L and 22R so as to extend in the vertical direction with respect to the knuckles 16L and 16R and move up and down integrally with the front end portion of the corresponding suspension arm and the knuckle.

Figure 3:
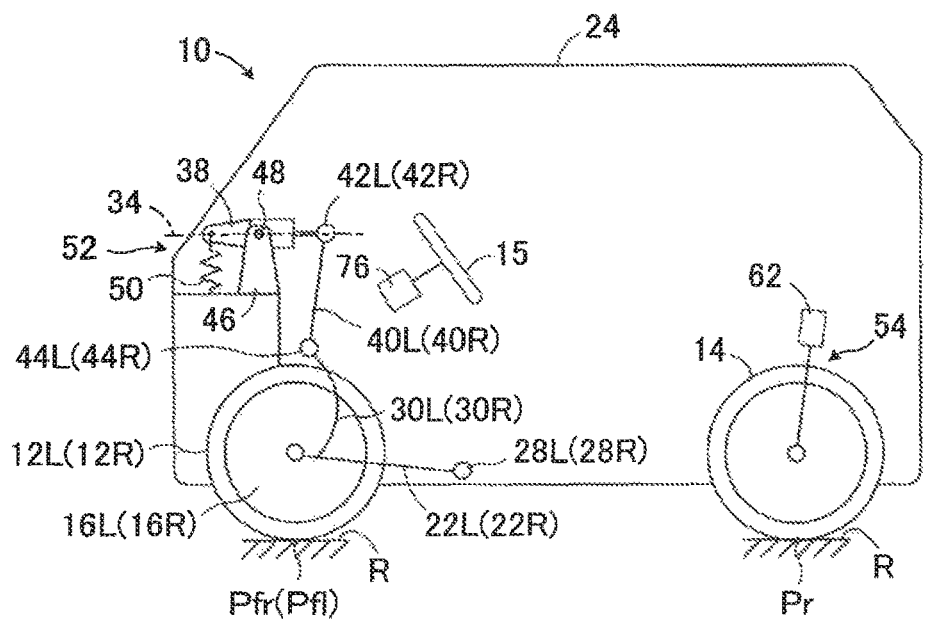
FIG. 3 is a schematic lateral vertical cross-sectional view showing the automatic tilting vehicle of the embodiment taken along a center vertical cut plane in the front-rear direction.

As shown in FIG. 1 and FIG. 6, the knuckle arms 30L and 30R are linear as viewed in the longitudinal direction, but as shown in FIG. 3, they are substantially C-shaped opened forward as seen in the lateral direction so that they do not interfere with the members of the knuckles 16L and 16R. The knuckle arms 30L and 30R may be integrally connected to the knuckles 16L and 16R, respectively, and may be substantially C-shaped opened rearward or linear when viewed in the lateral direction.

The rotational direction and the output of the in-wheel motor are controlled by the electronic control unit 20 according to the operation amount of a shift lever and an accelerator pedal (neither shown) by the driver. The braking forces of the front wheels 12L and 12R and the rear wheel 14 are controlled by the electronic control unit 20 controlling a braking device 32 which operates according to an operation amount of a brake pedal (not shown) by the driver.

The vehicle tilting device 18 includes a swing member 36 swinging about a swing axis 34 extending in the longitudinal direction of the vehicle, a tilt actuator 38 for swinging the swing member 36 about the swing axis 34, and a pair of tie rods 40L and 40R. The tie rods 40L and 40R extend substantially in the vertical direction on both lateral sides of the swing axis 34 and are pivotally connected at their upper ends to the corresponding outer ends of the swing member 36 by joints 42L and 42R. It is preferable that the joints 42L and 42R are joints each including a pivot pin with a rubber bush having an axis extending substantially in the vehicle longitudinal direction, but they may be a joint such as a ball joints.

Further, the tie rods 40L and 40R are pivotally connected at the lower ends to the upper ends of the knuckle arms 30L and 30R by joints 44L and 44R like the ball joint, respectively. As described above, the knuckle arms 30L and 30R extend substantially upward from the suspension arms 22L and 22R, respectively, so as to extend in the vertical direction with respect to the knuckles 16L and 16R, and move integrally with the corresponding knuckles. Therefore, the lower ends of the tie rods 40L, 40R are integrally connected to the knuckles 16L, 16R via the knuckle arms 30L, 30R and the suspension arms 22L, 22R, respectively.

Figure 2:
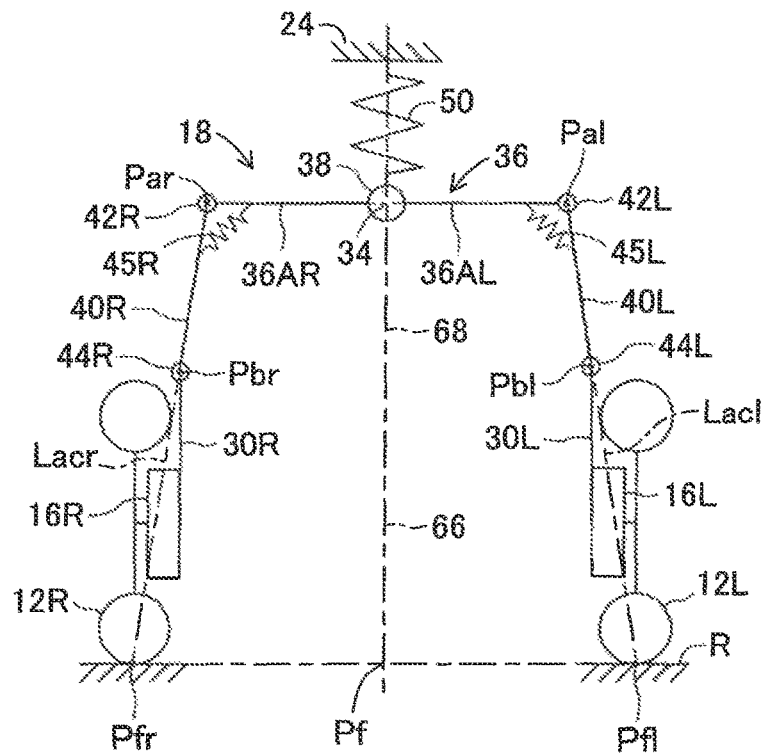
FIG. 2 is a skeleton diagram showing the front wheels and the vehicle tilting device of the embodiment as viewed from the front of the vehicle.

As shown in FIG. 2, the centers of the joints 42L and 42R are referred to as pivot points Pal and Par, respectively, centers of the joints 44L and 44R are referred to as pivot points Pbl and Pbr, respectively, and the grounding points of the front wheels 12L and 12R are represented by Pfl and Pfr, respectively. The pivot points Pbl and Pbr are located higher than the upper peripheral portions of the tires of the front wheels 12L and 12R, respectively when the vehicle 10 is in a standard state where the vehicle 10 is stationary or running straight on a horizontal road, but they may be located at a position equal to or lower than the upper peripheral portions of the tires.

When the vehicle 10 is in the standard state, the pivot points Pal and Par, the pivot points Pbl and Pbr, and the grounding points Pfl and Pfr, respectively are symmetrical with respect to a center plane 66 of the vehicle 10. A distance between the pivot points Pbl and Pbr is greater than a distance between the pivot points Pal and Par and less than a distance between the grounding points Pfl and Pfr. The pivot point Pbl is substantially on a line segment Lacl connecting the pivot point Pal and the grounding point Pfl, and the pivot point Pbr is substantially on a line segment Lacr connecting the pivot point Par and the grounding point Pfr. However, the pivot points Pbl and Pbr may not be located on the line segments Lacl and Lacr, respectively.

The swing member 36 has a boss portion 38B rotatable about the swing axis 34 and arm portions 36AL and 36AR integrally formed with the boss portion 36B and extending in opposite directions from the boss portion 368, and functions as a swing arm member that can swing about the swing axis 34. The effective lengths of the arm portions 36AL and 36AR, that is, the distance between the axis 34 and the pivot point Pbl and the distance between the axis 34 and the pivot point Pbr are the same.

As can be understood from the above description, the left and right front wheels 12L and 12R, the tilt actuator 38, the swing member 36, and the pair of tie rods 40L and 40R are resiliently biased to their positions at which they take during the straight running of the vehicle. An urging means for resiliently urging the above members is made up of elasticity of the suspension arms 22L and 22R, rubber bush devices incorporated in the joints 28L and 28R at the rear ends of the suspension arms, rubber bushings incorporated in the joints 42L and 42R and so on.

In FIGS. 2 and 10 to 13, these biasing means are collectively shown as virtual elastic members 45L and 45R. The elastic members 45L and 45R may be considered to generate forces for suppressing the changes where the angles formed by the arm portions 36AL and 36AR and the tie rods 40L and 40R change from the angles in the standard state. That is, when the angle formed by the corresponding arm portion and the tie rod becomes smaller than the angle in the standard state, each elastic member generates a compressive force so as to increase the angle. Conversely, when the angle formed by the corresponding arm portion and tie rod becomes larger than the angle in the standard state, each elastic member generates a tensile force to reduce the angle.

The tilt actuator 38 may be a rotary electric actuator such as a harmonic drive (registered trademark) including an electric motor 38M such as a DC brushless motor and a reduction gear not shown in the figure. The output rotary shaft of the actuator 38 protrudes rearward and the boss portion 36B is fixedly attached to the tip of the output rotary shaft so that the rotary motion of the electric motor 38M is transmitted as a swing motion to the swing member 38. The actuator 38 may be a reciprocating type or a swing type actuator. In the former case, the reciprocating motion of the actuator is converted into a swing motion by the motion converting mechanism and is transmitted to the swing member 36.

As shown in FIG. 3, the actuator 38 is arranged between a pair of brackets 46 laterally spaced and fixed to the vehicle body 24. The actuator 38 has a pair of pivot shafts 48 protruding laterally away from each other and is pivotally supported about the pivot shafts 48 as the shafts 48 are rotatably supported by the brackets 46. A suspension spring 50 and a shock absorber (not shown) are interposed between the front end portion of the actuator 38 and the vehicle body 24 below the front end portion. Therefore, the actuator 38 is connected to the vehicle body via the suspension spring 50 so that the actuator 38 can be displaced in the vertical direction with respect to the vehicle body 24 and the displacement and inclination in the lateral direction with respect to the vehicle body are restricted. It should be noted that the suspension spring 50 may be an elastic member such as a compression coil spring.

The suspension spring 50 and the shock absorber cooperate with the suspension arms 22L and 22R and the like to constitute a front wheel suspension 52. Therefore, the front wheels 12L, 12R and the vehicle tilting device 18 are suspended from the vehicle body 24 by the front wheel suspension 52 so that they can move upward and downward with respect to the vehicle body 24 but are restricted from relatively inclining in the lateral direction with respect to the vehicle body. Impact that the front wheels 12L and 12R receive from a road surface and is transmitted to the vehicle body 24 during traveling of the vehicle is alleviated by the suspension spring 50. The relative vertical vibration between the front wheels 12L and 12R and the vehicle body 24 is attenuated by the shock absorber not shown in the figures.

The actuator 38 receives a downward force via the pair of brackets 46 due to gravity acting on the vehicle body 24. However, since the actuator 38 is prevented from being displaced downward by the vehicle tilting device 18, the actuator swings about the pivot shafts 48 so that the rear portion is displaced upward with respect to the vehicle body 24 and the front side portion is displaced downward with respect to the vehicle body 24. Therefore, since the suspension spring 50 is compressively deformed, a weight of the vehicle body 24 is supported by the spring force by compression deformation of the suspension spring 50. An amount of compressive deformation of the suspension spring 50 increases when the front wheels 12L and 12R bounce and the rear portion of the actuator 38 is displaced upward, and conversely decreases when the front wheel rebounds and the rear portion of the actuator 38 is displaced downward.

Figure 5:
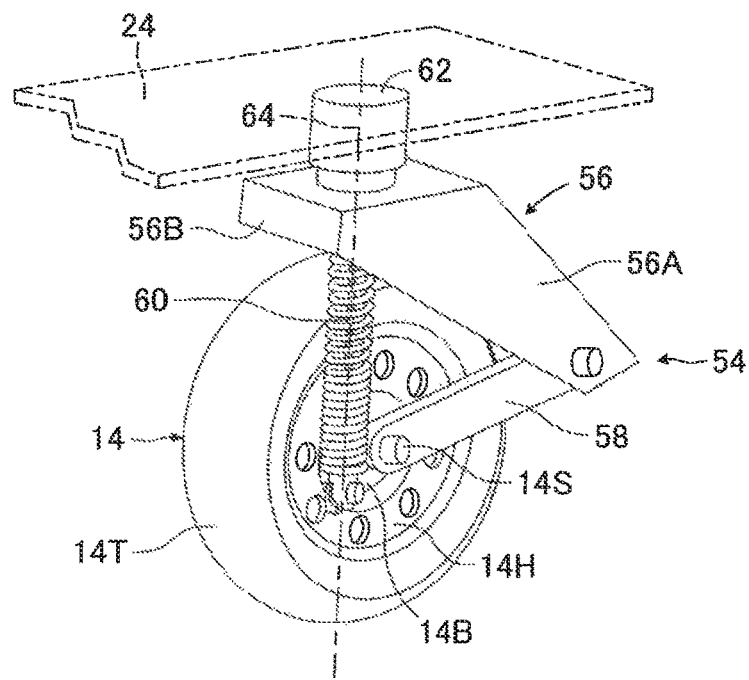
FIG. 5 is an enlarged perspective view showing a rear wheel and a rear wheel suspension according to the embodiment.

As shown in FIG. 5, the rear wheel 14 includes a wheel 14 H and a tire 14T attached to the outer periphery of the wheel, and is suspended from the vehicle body 24 by a rear wheel suspension 54. The rear wheel suspension 54 includes an upper arm member 56 positioned above the rear wheel 14 and a pair of swing arms 58 positioned on both lateral sides of the rear wheel 14. The upper arm member 56 has a base portion 56B and a pair of upper arm portions 56A extending rearward and downward from the base portion on both sides of the rear wheel 14. Each swing arm 58 is pivotally connected to the lower end portion of the corresponding upper arm member 56A at the rear end so as to be vertically pivotable, and rotatably supports the rotation shaft 14S of the rear wheel 14 at the front end. A suspension spring 60 and a shock absorber (not shown) are interposed between a support member 14B that rotatably supports the wheel 14H and the base portion 56B. Therefore, the rear wheel 14 can move up and down with respect to the vehicle body 24, and the relative vertical vibration thereof is attenuated by the shock absorber.

A steering actuator 62 is fixed to the vehicle body 24. The steering actuator 62 is a rotary type actuator and includes an electric motor (not shown) such as a DC brushless motor. A rotating shaft of the electric motor extends downward and the tip of the rotating shaft is integrally connected to the base portion 56B of the upper arm member 56 so that the rotational motion of the electric motor is transmitted to the upper arm member 56. The steering actuator 62 may also be a reciprocating type electric actuator. In that case, the reciprocating motion of the actuator may be converted into a rotational motion by a motion converting mechanism and may be transmitted to the upper arm member 56.

As can be understood from the above descriptions, the rear wheel 14 is suspended from the vehicle body 24 by the rear wheel suspension 54 so as to be able to move up and down with respect to the vehicle body 24 and to be rotatable about the kingpin axis 64 which is the same as the axis of the rotation axis of the electric motor of the steering actuator 62. When the vehicle 10 turns, the rear wheel 14 is steered by being rotated about the kingpin shaft 64 by the actuator 62. Since the kingpin axis 64 cannot be inclined in the lateral direction with respect to the vehicle body 24, when the vehicle body 24 is inclined in the lateral direction as described later, the rear wheel 14 also inclines in the same lateral direction by the same angle as the vehicle body 24.

When the rear wheel 14 are steered by the steering actuator 62, a self-aligning torque acts on the rear wheel. Consequently, the steering actuator must steer the rear wheel against self-aligning torque to control a steered angle δr of the rear wheel to a target steered angle δrt. The self-aligning torque increases as a magnitude of the steered angle δr of the rear wheel increases, increases as the vehicle speed V increases, and decreases as a ground load of the rear wheel decreases. Since a control current Ir supplied to the steering actuator varies according to the self-aligning torque, it increases as a magnitude of the steered angle δr of the rear wheel increases, increases as a vehicle speed V increases, and decreases as a ground load of the rear wheel decreases.

As shown in FIG. 6, when the swing member 36 swings about the swing axis 34, the tie rods 40L and 40R vertically move in opposite directions, so that the front wheels 12L and 12R move up and down in opposite directions with respect to the vehicle body 24, whereby the vehicle 10 is inclined in the lateral direction. In FIG. 6, the elastic deformation of the tire due to the action of the centrifugal force acting on the vehicle 10 is shown in an exaggerated manner. Although not shown in FIG. 6, as the tilt angle θ of the vehicle 10 increases, the pivot point Pbr on the turning outer wheel side moves toward the outside in the lateral direction of the vehicle, and conversely, the pivot point Pbl on the turning inner wheel side moves toward the inside in the lateral direction of the vehicle (see FIG. 2).

The knuckle arms 30L and 30R and the tie rods 40L and 40R, when they receive compressive loads for supporting the vehicle body 24 and the vehicle tilting device 18 is operated, the compression load increase on the turning outer wheel side and decrease on the turning inner wheel side. The knuckle arms 30L and 30R and the tie rods 40L and 40R are configured so as not to be substantially curvingly deformed even if the compressive loads vary due to the operation of the vehicle tilting device 18. That is, the knuckle arms and the tie rods are configured so that even if the compressive loads fluctuate due to the operation of the vehicle tilting device 18, a reduction rate of the distance between the pivot points Pal and Par at the upper end and the pivot points Pbl and Pbr at the lower end is 3% or less, preferably 2% or less, more preferably 1% or less. Notably, the reduction rate may be, for example, 3% or more in a range of 10% or less.

Figure 4:
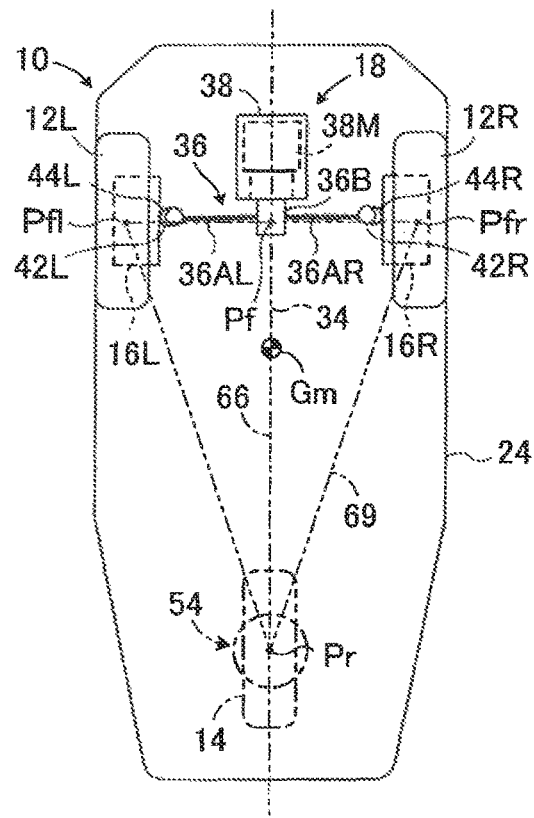
FIG. 4 is an exploded plan sectional view of the automatic tilting vehicle of the embodiment, taken along a horizontal section.

As shown in FIGS. 4 and 6, the center of gravity Gm of the vehicle 10 in the standard loading state is located behind and lower than the actuator 38 on the center plane 66 of the vehicle. The tilt angle θ of the vehicle 10 is an angle that the center plane 66 forms with respect to the vertical direction 68. As shown in FIG. 4, an isosceles triangle formed by connecting the grounding points Pfl, Pfr of the front wheels 12L, 12R and the grounding point Pr of the rear wheel 14 is referred to as a triangle 69.

A change rate of the tilt angle θ of the vehicle 10, that is, a tilt angular velocity θd of the vehicle, is detected by a gyroscope 70. A signal indicating the tilt angular velocity θd of the vehicle detected by the gyroscope 70 is input to the electronic control unit 20. The tilt angle θ becomes zero when the swing angle of the swing member 36 is zero and the center plane 66 coincides with the vertical direction 68, and becomes a positive value when the vehicle 10 is inclined to the left. The tilt angular velocity θd is a positive value when the tilt angle of the vehicle 10 changes to the left. Furthermore, since the tilt angle θ of the vehicle 10 is substantially the same as a roll angle (not shown) of the vehicle body 24, the roll angle of the vehicle body may be detected as a tilt angle θ of the vehicle 10 by a roll angle sensor.

A steering angle St that is equal to the rotation angle of the steering wheel 15 is detected by a steering angle sensor 72 as a steering operation amount of a driver. Further, signals indicating wheel speeds Vfl, Vfr and Vr of the left and right front wheels 12L, 12R and the rear wheel 14 detected by wheel speed sensors 74FL, 74FR, 74R are input to the electronic control unit 20 and a signal indicating a rotation angle φm of the electric motor 38M detected by a rotation angle sensor 76 is input to the electronic control unit 20.

The electronic control unit 20 calculates a vehicle speed V based on the wheel speeds Vfl, Vfr and Vr, calculates a target steered angle δrt of the rear wheel 14 based on a steering angle St and the vehicle speed V and controls the steering actuator 62 so that a steered angle δr of the rear wheel becomes the target steered angle δrt, thereby steering the rear wheel 14 in a steer-by-wire manner. Notably, the rotation angle φm becomes zero when the swing angle of the swing member 36 is zero and becomes a positive value when the swing member 36 swings so that the vehicle 10 tilts to the left.

Although not shown in the figure, a signal indicating an accelerator position Ap which is a depression operation amount of an accelerator pedal operated by the driver is input from an accelerator position sensor to the electronic control unit 20. To the electronic control unit 20, a signal indicating a shift position Sp, which is an operation position of a shift lever operated by the driver, is input from a shift position sensor. Further, to the electronic control unit 20, signals indicating a longitudinal acceleration Gx, a lateral acceleration Gy, and the vertical acceleration Gz of the vehicle 10 are input from a three-axis acceleration sensor 78 and a signal indicating a pedaling force Fp to a brake pedal (not shown) by the driver is input from a pedal effort sensor 80. It should be noted that the longitudinal acceleration Gx is detected as positive acceleration in the forward direction of the vehicle.

The electronic control unit 20 controls the driving force of the front wheels 12L and 12R by controlling the output and rotation direction of the in-wheel motors based on the accelerator position Ap and the shift position Sp. Further, the electronic control unit 20 controls the braking device 32 based on the pedal effort Fp, thereby controlling the braking forces of the front wheels 12L, 12R and the rear wheel 14. During braking, regeneration by an in-wheel motors may be performed.

Figure 7:
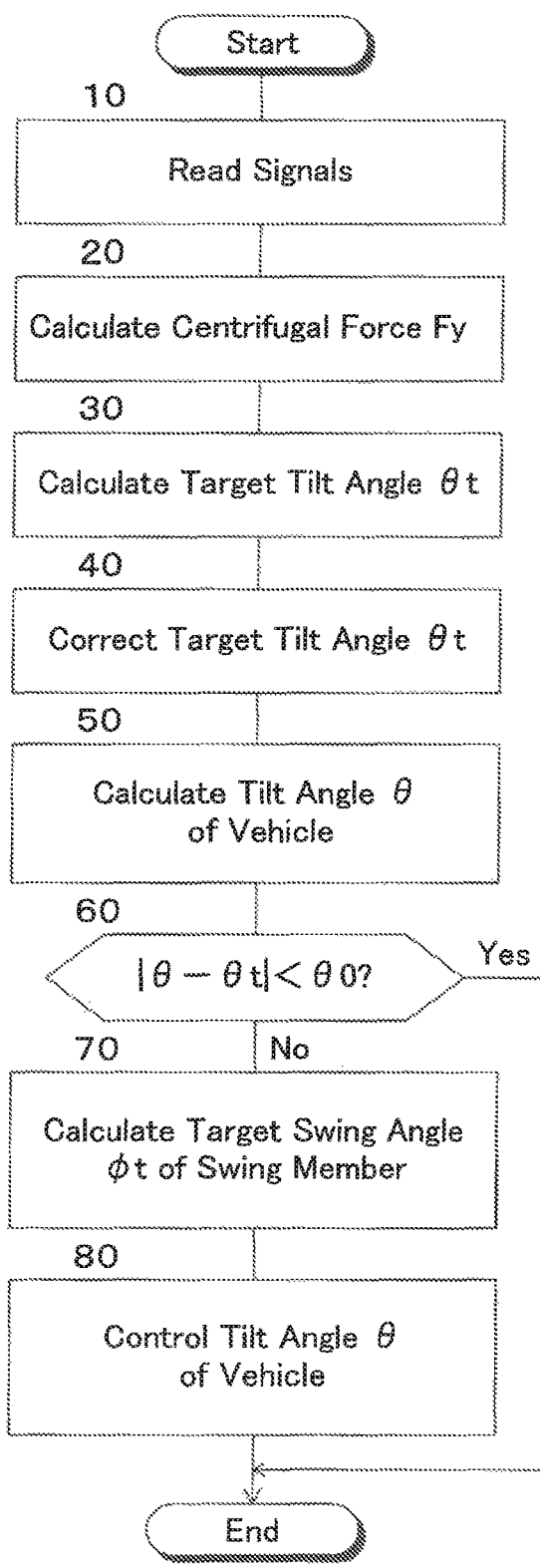
FIG. 7 is a flowchart showing a vehicle tilt angle control routine according to the embodiment.

The electronic control unit 20 calculates, according to the flowchart shown in FIG. 7, a target tilt angle θt of the vehicle 10 for tilting the vehicle 10 toward the inside of a turn so that a resultant force Fyg of a centrifugal force Fy acting on the center of gravity Gm of the vehicle 10 and the gravity Fg acts in a predetermined direction. Further, the electronic control unit 20 controls the rotation angle φm of the electric motor 38M of the actuator 38 so that the tilt angle θ of the vehicle becomes the target tilt angle θt. Therefore, the electronic control unit 20 functions as a control unit configured to tilt the vehicle 10 by controlling the swing angle φ of the swing member 36 of the vehicle tilting device 18.

Figure 12:
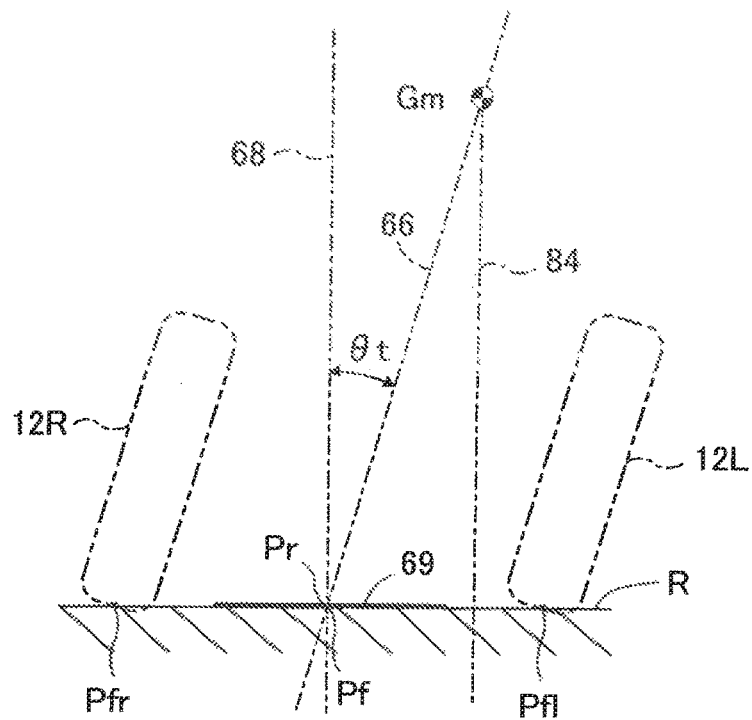
FIG. 12 is a front longitudinal cross-sectional view showing a situation in which a perpendicular passing through the center of gravity of the vehicle turning left passes through outside the range of a triangle connecting grounding points of the left and right front wheels and a grounding point of the rear wheel.
Figure 13:
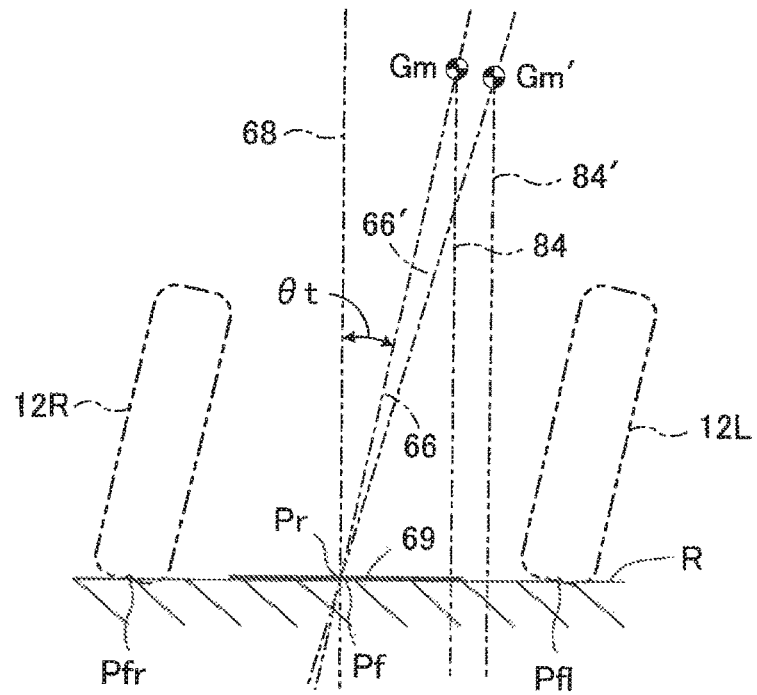
FIG. 13 is a front vertical sectional view showing a situation in which a tilt angle of the vehicle is decreasingly corrected such that a perpendicular passing through the center of gravity of the vehicle turning left passes within a range of a triangle formed by connecting the grounding points of the left and right front wheels and the grounding point of the rear wheel.

When, as shown in FIG. 12, a perpendicular line 84 passing through the center of gravity Gm of the vehicle 10 passes outside the range of the triangle 69 (see FIG. 4) or through a predetermined tolerable margin set inside oblique sides of the triangle 69, the electronic control unit 20 decreasingly corrects the target tilt angle θt so that, as shown in FIG. 13, the perpendicular line 84 passes inside the tolerable margin. Therefore, the tilt angle of the vehicle when the perpendicular line 84 passes inside an oblique side of the triangle 69 by a distance of the predetermined tolerable margin being referred to as a maximum allowable tilt angle θamax, the target tilt angle θt is corrected as necessary so that a magnitude of the target tilt angle does not exceed the maximum allowable tilt angle θamax. Notably, the predetermined margin is preset in consideration of manufacturing tolerances of various members and the like. Further, in FIG. 13, the positions of the center of gravity Gm, the center plane 66 and the perpendicular line 84 shown in FIG. 12 are indicated by reference symbols Gm', 66' and 84', respectively.

Figure 18:
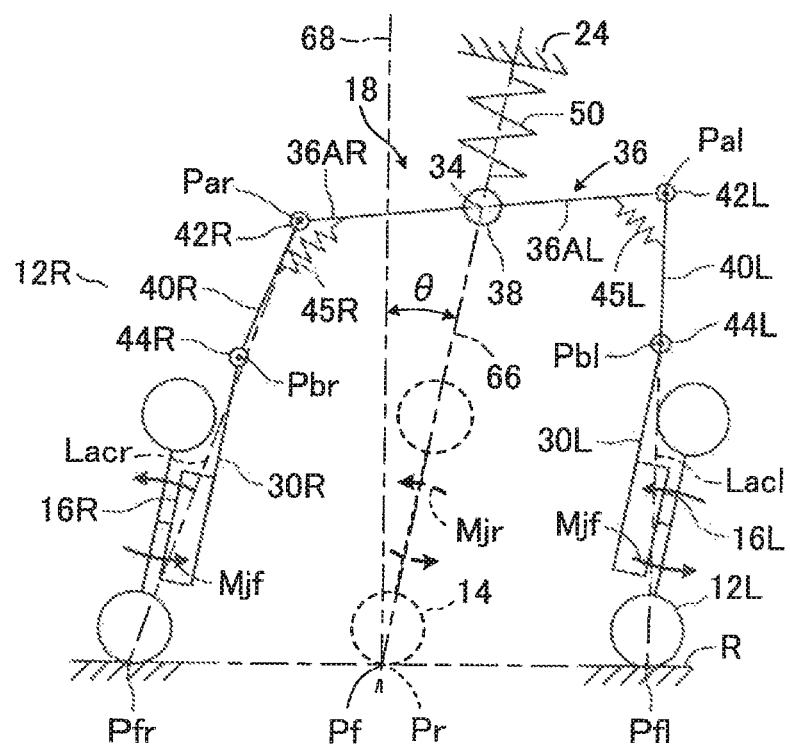
FIG. 18 is a skeleton diagram showing the front and rear wheels and the vehicle tilting device according to the embodiment when a tilt angle of the vehicle turning left is an allowable maximum tilt angle, as viewed from the front of the vehicle.

As described above, as the tilt angle θ of the vehicle 10 increases, the pivot point Pbl on the turning outer wheel side moves toward the outside in the lateral direction of the vehicle, and conversely, the pivot point Pbr on the turning inner wheel side moves toward the inside in the lateral direction of the vehicle. The embodiment is configured such that, as shown in FIG. 18, when the vehicle 10 is tilted to the inside of a turn, the pivot point Pbr is located on the outside of the turn with respect to the line segment Lacr, and the pivot point Pbl is located on the line segment Lacl or inside the vehicle with respect to the line segment Lacl.

The electronic control unit 20 calculates, as will be described in detail later, a target lateral acceleration Gyt of the vehicle 10 based on a steering angle St and a vehicle speed V, and calculates a target steered angle δrt of the rear wheel 14 based on the target lateral acceleration Gyt and the vehicle speed V.

Further, in a situation where the steered angle δr of the rear wheel 14 is large, the electronic control unit 20 determines whether or not a ground load of the rear wheel is decreased based on a deceleration Gxb of the vehicle 10 determined based on a longitudinal acceleration Gx. When the determination is affirmative and a control current Ir supplied to the steering actuator 62 is equal to or less than a reference current Ir0, the electronic control unit 20 controls a steered angle δr of the rear wheel 14 to zero so that a gyro moment of the rear wheel 14 acts in the lateral direction of the vehicle 10.

Figure 8:
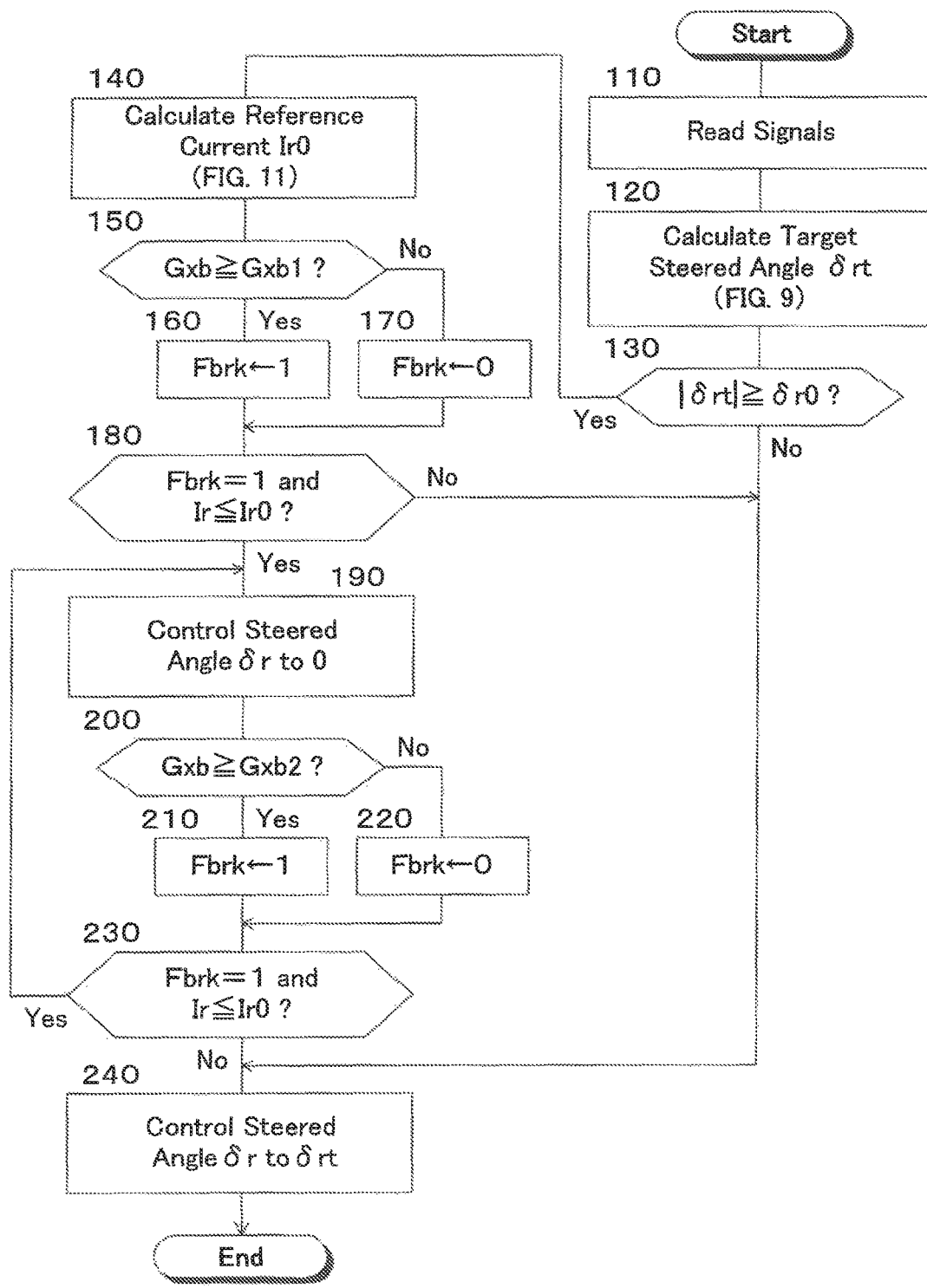
FIG. 8 is a flowchart showing a steered angle control routine of the rear wheel in the embodiment.

Although the electronic control unit 20 and the sensors such as the gyroscope 70 are shown outside the vehicle 10 in FIG. 1, they are mounted on the vehicle 10. The electronic control unit 20 may be a microcomputer having, for example, a CPU, a ROM, a RAM, and an input/output port device, which are connected to each other by a bi-directional common bus. The control program corresponding to the flowcharts shown in FIGS. 7 and 8 are stored in the ROM, and the tilt angle θ, the steered angle δr of the rear wheel 14 and the like of the vehicle 10 are controlled by the CPU according to the control programs.

<Vehicle Tilt Angle Control Routine>

Next, the tilt angle control routine of the vehicle in the embodiment will be described with reference to the flowchart shown in FIG. 7. The tilt angle control according to the flowchart shown in FIG. 7 is repeatedly executed at predetermined time intervals when the ignition switch (not shown) is on.

First, in step 10, signals such as a signal indicating a tilt angular velocity θd of the vehicle detected by the gyroscope 70 are read.

Figure 9:
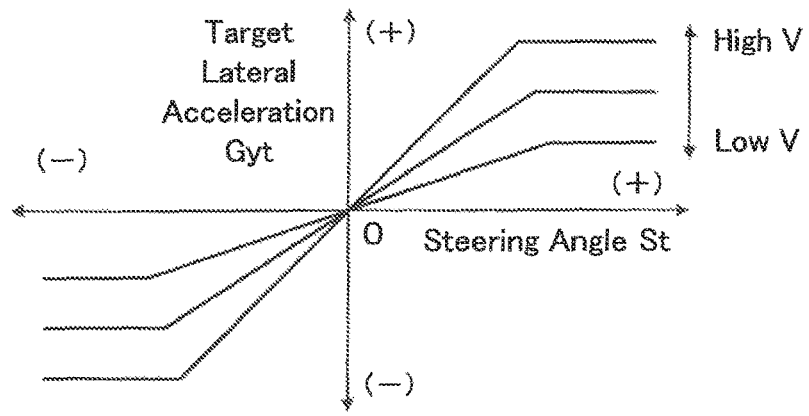
FIG. 9 is a map for calculating a target lateral acceleration Gyt of the vehicle based on a steering angle St and a vehicle speed V.

In step 20, the vehicle speed V is calculated on the basis of the wheel speeds Vfl, Vfr and Vr, and a map shown in FIG. 9 is referred to based on a steering angle St and a vehicle speed V, whereby a target lateral acceleration Gyt is calculated. Further, a centrifugal force Fy acting on the center of gravity Gm of the vehicle 10 by turning is calculated as a product of the target lateral acceleration Gyt and a mass M of the vehicle. Incidentally, as shown in FIG. 9, the target lateral acceleration Gyt is calculated such that the larger an absolute value of the steering angle St is, the larger the magnitude is, and the larger the vehicle speed V is, the larger the magnitude is.

In step 30, a target tilt angle θt of the vehicle for tilting the vehicle 10 toward the turning inner side is calculated. In this case, the target tilt angle θt of the vehicle is calculated so that as shown in FIG. 6, a resultant force Fyg of the centrifugal force Fy acting on the center of gravity Gm of the vehicle 10 and the gravity Fg acts on a straight line 82 connecting a midpoint Pf of the grounding points Pfl and Pfr of the front wheels 12L and 12R and the grounding point Pr of the rear wheel 14.

Note that the target tilt angle θt may be calculated according to the following equation (1) based on the target lateral acceleration Gyt and the gravitational acceleration G of the vehicle. The gravitational acceleration G in the following equation (1) may be a positive constant.

$$\theta t = \tan^{-1}(Gyt/G) \quad (1)$$

In step 40, when a magnitude of the target tilt angle θt of the vehicle exceeds the maximum allowable tilt angle θamax, the target tilt angle θt is corrected so that the magnitude becomes the maximum allowable tilt angle θamax. When the magnitude of the target tilt angle θt is equal to or less than the maximum allowable tilt angle θamax, that is, when the perpendicular line 84 passing through the center of gravity Gm of the vehicle 10 passes inside the tolerable margin of the triangle 69 which is not shown in the drawing, the target tilt angle θt of the vehicle is not corrected.

In step 50, a signal indicating the tilt angular velocity θd of the vehicle 10 detected by the gyroscope 70 is read, and the tilt angle θ of the vehicle 10 is calculated by integrating the tilt angular velocity θd. Notably, when the gyroscope 70 outputs a signal indicating the tilt angle θ of the vehicle 10, the integration of a tilt angular velocity θd is unnecessary.

In step 60, it is determined whether or not an absolute value of the deviation θ−θt between the tilt angle θ of the vehicle 10 and the target tilt angle θt of the vehicle is smaller than a reference value θ0 (a positive constant). When an affirmative determination is made, since the correction of the tilt angle θ of the vehicle is unnecessary the control of the tilt angle is temporarily terminated, and when a negative determination is made, the control of the tilt angle proceeds to step 70.

In step 70, a target swing angle φt of the swing member 36 for setting the deviation θ−θt between the tilt angle θ of the vehicle 10 and the target tilt angle θt to zero is calculated and a target rotation angle φmt of the electric motor 38M of the tilt actuator 38 for achieving the target swing angle φt is calculated.

In step 80, the electric motor 38M is controlled so that the rotation angle φm of the electric motor 38M becomes the target rotation angle φmt so as to control the swing angle φ of the swing member 36 to the target swing angle φt, whereby the tilt angle θ of the vehicle 10 is controlled so as to be the target tilt angle θt.

As can be understood from the above description, in steps 10 to 30, the target tilt angle θt of the vehicle for tilting the vehicle 10 toward the inside of a turn is calculated. In step 50, a tilt angle θ of the vehicle 10 is calculated based on a tilt angular velocity θd of the vehicle 10 detected by the gyroscope 70. Further, in steps 60 to 80, the electric motor 38M of the tilt actuator 38 is controlled so that a magnitude of the deviation θ−θt between the tilt angle θ of the vehicle 10 and the target tilt angle θt becomes equal to or smaller than the reference value θ0 and a swing angle φ of the swing member 36 reaches the target swing angle φt. Therefore, the vehicle 10 can be turned steadily by tilting the vehicle 10 toward the inside of a turn so that a resultant force Fyg of the centrifugal force Fy acting on the center of gravity Gm of the vehicle 10 and the gravity Fg acts in a predetermined direction.

In step 40, when a perpendicular line 84 passing through the center of gravity Gm of the vehicle 10 passes outside the range of the triangle 69 or through the tolerable margin, the target tilt angle θt of the vehicle is corrected so that the perpendicular line 84 passes inside the tolerable margin of the triangle 69. Therefore, even if the vehicle is stopped in a state in which the tilt angle θ of the vehicle is controlled so as to be the target tilt angle θt equal to the maximum allowable tilt angle θamax, it is possible to stop the vehicle stably.

<Steering Angle Control Routine for Rear Wheel>

Next, the steered angle control routine of the rear wheel in the embodiment will be described with reference to the flowchart shown in FIG. 8. The control of the steered angle according to the flowchart shown in FIG. 8 is also repeatedly executed at predetermined time intervals when the ignition switch not shown is on.

First, in step 110, signals such as a signal indicating a steering angle St detected by the steering angle sensor 72 are read.

In step 120, a target steered angle δrt of the rear wheel 14 is calculated based on the target lateral acceleration Gyt and a vehicle speed V of the vehicle 10 with a wheel base of the vehicle 10 as L, according to the following equation (2).

$$\delta rt = \tan^{-1}(L \cdot Gyt/V^2) \quad (2)$$

Figure 10:
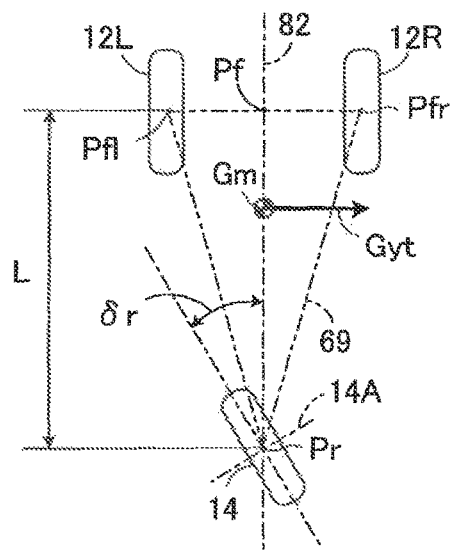
FIG. 10 is a view for explaining a wheel base of the vehicle and a steered angle δr of the rear wheel.

As shown in FIG. 10, the wheel base L of the vehicle 10 is a distance between a midpoint Pf of the grounding points Pfl and Pfr of the left and right front wheels 12L and 12R and the grounding point Pr of the rear wheel 14. A steered angle δr of the rear wheel 14 is an angle formed by s rotation center plane of the rear wheel 14 at the position of the rotation axis 14A with respect to the straight line 82 connecting the midpoint Pf and the grounding point Pr of the rear wheel 14, and a target steered angle δrt is a target value of the steered angle δr. In FIG. 10, for the purpose of clarity, each wheel is illustrated not to be tilted.

In step 130, it is determined whether or not an absolute value of the target steered angle δrt of the rear wheel 14 is equal to or greater than a reference value δr0 (a positive constant), that is, whether or not a magnitude of the steered angle δr of the rear wheel 14 is large and the vehicle 10 is turning. When a negative determination is made, the control of the steered angle proceeds to step 240, and when an affirmative determination is made, that is, when it is determined that the vehicle 10 is in a turning state, the control of the steered angle proceeds to step 140.

Figure 11:
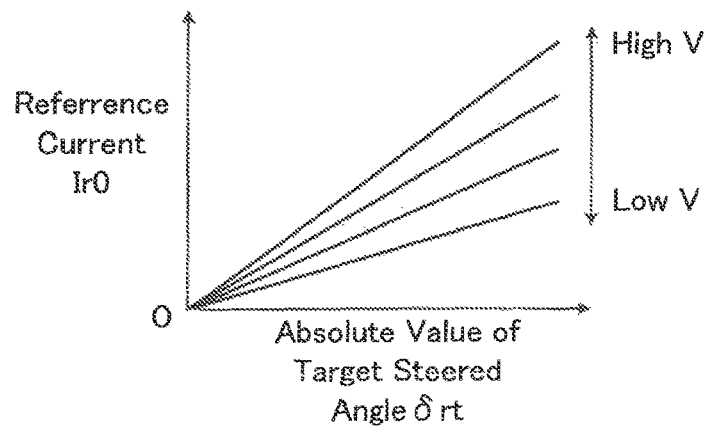
FIG. 11 is a map for calculating a reference current Ir0 for a control current Ir supplied to the steering actuator based on the target steered angle δrt of the rear wheel and a vehicle speed V.

In step 140, a map shown in FIG. 11 is referred to based on the target steered angle δrt of the rear wheel 14 and a vehicle speed V, whereby a reference current Ir0 for the control current Ir supplied to the steering actuator 62 is calculated. The reference current Ir0 is the minimum value of the control current Ir required to control the steered angle δr of the rear wheel to the target steered angle δrt against a self-aligning torque acting on the rear wheel 14 by the steering actuator 62. As shown in FIG. 11, the reference current Ir0 is calculated such that it increases as the absolute value of the target steered angle δrt of the rear wheel 14 increases, and increases as a vehicle speed V increases.

In step 150, it is determined whether a deceleration Gxb (=−Gx) of the vehicle 10 determined based on a longitudinal acceleration Gx is equal to or greater than a first reference value Gxb1 (a positive constant). When an affirmative determination is made, in step 160, a flag Fbrk regarding whether or not the vehicle 10 is in a deceleration state of high deceleration is set to 1. When a negative determination is made, in step 170, the flag Fbrk is reset to zero. It should be noted that the first reference value Gxb1 is a reference value for determining whether or not the vehicle is decelerated and a load transfer to the front wheel side is high.

In step 180, it is determined whether or not the flag Fbrk is 1 and the control current Ir is equal to or less than the reference current Ir0. That is, it is determined whether or not a ground load of the rear wheel 14 decreases and a torque required for the steering actuator 62 to control a steered angle δr of the rear wheel to the target steered angle δrt is decreased. When a negative determination is made, the control of the steered angle proceeds to step 240, and when an affirmative determination is made, the control of the steered angle proceeds to step 190.

In step 190, the steering actuator 62 is controlled such that a steered angle δr of the rear wheel 14 becomes zero irrespective of the target steered angle δrt.

In step 200, a signal indicating a longitudinal acceleration Gx of the vehicle 10 is read, and it is determined whether or not a deceleration Gxb of the vehicle determined based on the longitudinal acceleration Gx is equal to or greater than a second reference value Gb2 (a positive constant larger than the first reference value Gb1). When an affirmative determination is made, the flag Fbrk is set to 1 in step 210, and when a negative determination is made, the flag Fbrk is reset to zero in step 220.

It should be noted that the second reference value Gb 2 is also a reference value for determining whether or not a load transfer to the front wheel side is high, and for delaying a negative determination being made in step 230 described later in a process in which the load transfer to the front wheel side decreases. Since steps 190 to 230, which will be described later, are executed when an affirmative determination is made in step 180 and the flag Fbrk is 1, step 210 may be omitted.

In step 230, similarly to step 180, it is determined whether or not the flag Fbrk is 1 and the control current Ir is equal to or less than the reference current Ir0. When an affirmative determination is made, the control of the steered angle returns to step 190, and when a negative determination is made, the steering actuator 62 is controlled such that a steered angle δr of the rear wheel 14 becomes the target steered angle δrt in step 240. When a steered angle δr of the rear wheel 14 is controlled so as to be the target steered angle δrt as a result of the negative determination being made in step 240, the steered angle δr may be brought close to the target steered angle δrt at a predetermined change rate.

As can be understood from the above description, in step 120, a target steered angle δrt of the rear wheel 14 is calculated based on the target lateral acceleration Gyt of the vehicle 10 and a vehicle speed V. When the vehicle is substantially in a straight running state, a negative determination is made in step 130, and when the vehicle is in a turning state but a ground load of the rear wheel has not decreased due to deceleration, a negative determination is made in step 180. As a result, in step 240, the steering actuator 62 is controlled so that the steered angle δr of the rear wheel 14 becomes the target steered angle δrt.

When the vehicle 10 is in a turning state and the deceleration Gxb of the vehicle 10 is equal to or greater than the first reference value Gxb1 and a ground load of the rear wheel 14 is decreased due to the deceleration, in steps 130, 150 and 180, affirmative determinations are made and steps 190 to 230 are executed. Consequently, until the deceleration Gxb of the vehicle 10 becomes less than the second reference value Gb2, which is larger than the first reference value Gb1, the steered angle δr of the rear wheel 14 is controlled to be zero in step 190. Therefore, the steered angle δr becomes zero in a state in which the rear wheel 14 rotates and the gyro moment Mjr is acting.

Further, when at least one of the conditions is satisfied that the deceleration Gxb of the vehicle 10 becomes less than the second reference value Gb2 and a ground load of the rear wheel 14 recovers so that a control current Ir exceeds the reference current Ir0, a negative determination is made in step 230. As a result, in step 240, the steering actuator 62 is controlled so that the steered angle δr of the rear wheel 14 becomes the target steered angle δrt.

<Problem in which Tilt Angle of Vehicle Becomes Larger than Preferable Tilt Angle During Turning Deceleration>

Figure 14:
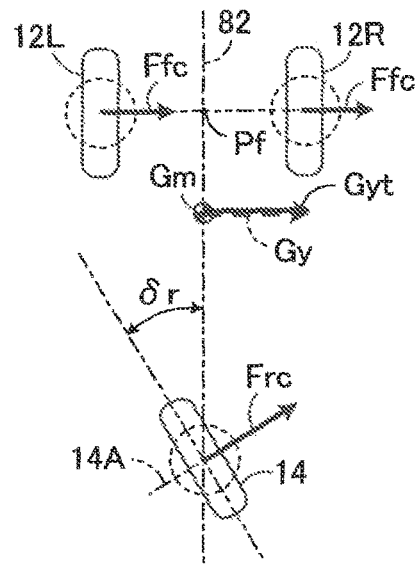
FIG. 14 is a diagram for explaining the actual lateral acceleration Gy of the vehicle and the like when the automatic tilting vehicle is turning without decelerating.
Figure 15:
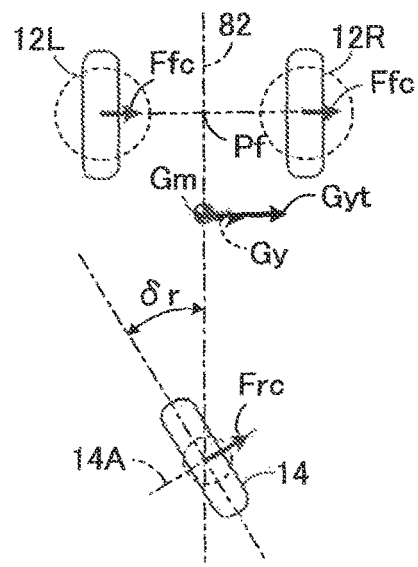
FIG. 15 is a diagram for explaining an actual lateral acceleration Gy of the vehicle and the like when the automatic tilting vehicle is decelerated in a state in which it is turning.

As described above, when the automatic tilting vehicle is turning and decelerating, an actual lateral acceleration of the vehicle decreases due to a decrease in a turning lateral force of the vehicle, and a target lateral acceleration of the vehicle becomes excessive as compared with an actual lateral acceleration. Consequently, there is a problem that the target tilt angle of the vehicle calculated based on the target lateral acceleration and the vehicle speed tends to be excessive. The problem will be explained with reference to FIGS. 14 and 15. In FIGS. 14 and 15, circles indicated by broken lines shown at the positions of the respective wheels indicate magnitudes of the ground loads of the respective wheels.

As shown in FIG. 14, when the vehicle is turning without decelerating, a turning lateral force Frc acts on the rear wheel 14, and turning lateral forces Ffc also act on the left and right front wheels. As a result, centripetal acceleration equal to a value obtained by dividing a resultant force Fvc of the turning lateral forces Frc and Ffc by a mass M of the vehicle acts on the center of gravity Gm of the vehicle, so that an actual lateral acceleration Gy of the vehicle becomes a large value equal to a lateral component of the centripetal acceleration of the vehicle. Therefore, the actual lateral acceleration Gy of the vehicle is substantially the same as the target actual lateral acceleration Gyt of the vehicle.

On the other hand, when the vehicle decelerates in a state in which the vehicle is turning, as shown in FIG. 15, ground loads of the front wheels 12L and 12R increase and a ground load of the rear wheel 14 decreases. Accordingly, a turning lateral force Frc of the rear wheel 14 decreases, and correspondingly turning lateral forces Ffc of the front wheels also decrease, so that an actual lateral acceleration Gy of the vehicle decreases due to the decrease of a resultant force Fvc of the lateral forces. As a result, a target lateral acceleration Gyt of the vehicle becomes excessive as compared with the actual lateral acceleration Gy, and a target tilt angle θt of the vehicle calculated based on the target lateral acceleration Gyt and a vehicle speed V becomes excessive. Therefore, even if the tilt actuator 38 is controlled so that a tilt angle θ of the vehicle becomes the target tilt angle θt, an actual tilt angle of the vehicle becomes larger than a preferable angle.

<Adjustment of Tilt Angle θ of Vehicle in Embodiment>

Figure 16:
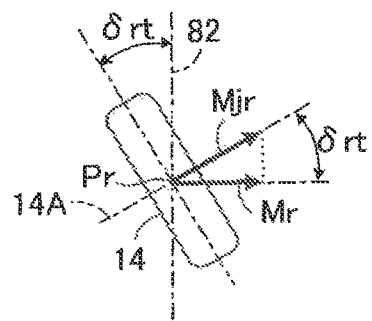
FIG. 16 is a diagram for explaining a gyro moment Mjr acting on the rear wheel when a steered angle δr of the rear wheel is controlled to a target steered angle δrt during turning deceleration of the vehicle.

As shown in FIG. 16, when a steered angle δr of the rear wheel 14 is controlled to a target steered angle δrt also during turning deceleration of the vehicle 10, a gyro moment Mjr acting on the rear wheel 14 acts in a direction inclined by an angle δrt with respect to the lateral direction of the vehicle as viewed from above the vehicle. Therefore, a moment Mr that acts so that the gyro moment Mjr reduces the tilt angle θ of the vehicle via the rear wheel suspension 54 is Mjr·cos δrt, and an effect of reducing the tilt angle θ is not high.

Figure 17:
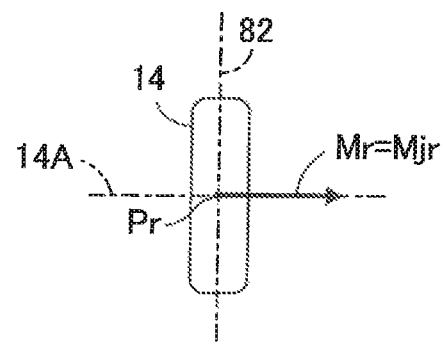
FIG. 17 is a diagram for explaining the gyro moment Mjr acting on the rear wheel when the steered angle δr of the rear wheel is controlled to be zero at the time of turning deceleration of the vehicle.

On the other hand, in the embodiment, as described above, when the vehicle 10 is decelerated in a turning state and a deceleration Gxb of the vehicle becomes the first reference value Gxb1 or more, a steered angle δr of the rear wheel 14 is controlled to be zero until the deceleration Gxb decreases below the second reference value Gb2. Accordingly, as shown in FIG. 17, since the same gyro moment Mr as the gyro moment Mjr acts in the lateral direction of the vehicle as viewed from the above of the vehicle, the gyro moment Mjr can be effectively utilized and the tilt angle of the vehicle θ can be reduced. Therefore, as compared to where a steered angle δr of the rear wheel is controlled to a target steered angle δrt, the tilt angle of the vehicle can be reduced so as to be close to a preferable angle suitable for a running condition of the vehicle, and the controllability of the tilt angle of the vehicle during turning deceleration can be improved.

<Other Problems Caused by Gyroscopic Moment Acting on Wheels>

In a conventional automatic tilting vehicle, each tie rod is integrally connected to a corresponding knuckle at the lower end and cannot pivot with respect to the knuckle. Therefore, since a range of vertical movement of the tie rod is limited to a narrow range, a range of angles in which the vehicle can be tilted is limited. A configuration is already known in which, in order to alleviate the limitations of the conventional automatic tilting vehicle, each tie rod is pivotally attached to an outer end of the swing member at the upper end and pivotally attached to a corresponding knuckle at the lower end, and a shock absorber and a suspension spring are disposed between an actuator and a vehicle body. In the automatic inclined vehicle of this configuration (hereinafter referred to as "improved automatic tilting vehicle"), left and right front wheels are suspended from the vehicle body by front wheel suspensions so that the left and right front wheels can relatively displace in the vertical direction with respect to the vehicle body but a relative inclination in the lateral direction with respect to the vehicle body is restricted.

In an improved automatic tilting vehicle, there is a problem that, due to an influence of gyro moments acting on the wheels, a vertical line passing through the center of gravity of the vehicle when the vehicle is turning and decelerating passes through a predetermined tolerable margin set inside a triangle formed by connecting grounding points of the left and right front wheels and the rear wheel. This problem will be described with reference to FIG. 18. In FIG. 18, members corresponding to the members shown in FIG. 2 and the like are given the same reference numerals as those given in FIG. 2 and the like.

FIG. 18 is a skeleton diagram showing a state in which an improved automatic tilting vehicle is inclined. Since the tilt actuator 38 is supported so as to pivot about the pivot shafts 48, when the swing member 36 is displaced downward and the rear portion of the actuator 38 is lowered, the front portion of the actuator 38 is raised and the suspension spring 50 expands. Therefore, in FIGS. 2 and 18, the suspension spring 50 is shown on the upper side of the actuator 38 so that the vertical displacement of the swing member 36 corresponds to the expansion and contraction deformation of the suspension spring 50.

In the conventional improved automatic tilting vehicle, when a magnitude of the tilt angle θ of the vehicle 10 is a large value such as the maximum allowable tilt angle θamax, the pivot point Pbr on the turning outer wheel side is located laterally outwardly of the line segment Lacr connecting the pivot point Par and the grounding point Pfr. The pivot point Pbl on the turning inner wheel side is located on or laterally inside the line segment Lacl connecting the pivot point Pal and the grounding point Pfl.

For example, when the vehicle 10 turns to the left, the swing member 36 is swung in the counterclockwise direction about the swing axis 34 as viewed from the front of the vehicle by a rotational torque of the actuator 38 so that the side of the turning outer wheel becomes lower. As a result, the tie rod 40R on the turning outer wheel side is pushed downwardly with respect to the vehicle body 24, and the tie rod 40L on the turning inner wheel side is lifted upward with respect to the vehicle body 24, resulting in that the entire vehicle 10 is tilted toward the inside of a turn. Therefore, the front wheels 12L and 12R and the rear wheel 14 are inclined toward the inside of the turn by substantially the same angle as the vehicle body 24.

When the front wheels 12L and 12R and the rear wheel 14 are inclined, gyro moments Mjf and Mjr act on the front wheels and the rear wheel, respectively, and the front wheels and the rear wheel tend to return to the positions in the standard state position of the vehicle 10. The gyro moment Mjf is transmitted to the vehicle body 24 via the suspension arms 22 L and 22 R, and the gyro moment Mjr is transmitted to the vehicle body 24 via the rear wheel suspension 54. Notably, since the front wheels 12L and 12R each incorporate an in-wheel motor and the mass of each front wheel is larger than the mass of the rear wheel 14, the gyro moments Mjf are larger than the gyro moment Mjr.

Since the front wheels and the rear wheel are in contact with the road surface R at grounding points, and, accordingly, they cannot be displaced in the lateral direction with respect to the road surface. As a result, the front wheels 12L and 12R attempt to pivot counterclockwise around the grounding points Pfl and Pfr, respectively, and the rear wheel 14 tries to pivot counterclockwise around the grounding point Pr. Accordingly, since the pivot points Pbl and Pbr attempt to rotate in the counterclockwise direction around the grounding points Pfl and Pfr, respectively, the pivot points Pal and Par are subjected to leftward and downward forces via the tie rods 40L and 40R, respectively.

When the pivot points Pal and Par are subjected to leftward and downward forces via the tie rods 40L and 40R, the swinging member 36 is displaced downward along the center plane 66 with respect to the vehicle body 24, so that the actuator 38 is also displaced downward, and a height of the vehicle body 24 is lowered. In addition, since the rotational speed of the front wheel 12R as the turning outer wheel is higher than a rotational speed of the front wheel 12L as the turning inner wheel, a magnitude of the gyro moment acting on the front wheel 12R is larger than a magnitude of the gyro moment acting on the front wheel 12L. Accordingly, since the gyroscopic moments acting on the front wheels 12L and 12R act to increase the distance between the pivot points Pbl and Pbr, the quadrilateral Pal-Pbl-Pbr-Par increases its base so that a height of the upper side Pal-Par decreases. Therefore, also by this action, the swing member 36 is displaced downward along the center plane 66 with respect to the vehicle body 24, and the height of the vehicle body 24 is lowered.

Therefore, when the pivot points Pal and Par receive leftward and downward forces, respectively, a positional relationship between the swing member 36 and the tie rods 40L and 40R becomes different from that in the standard state of the vehicle 10. As a result, amounts of elastic deformation of the elastic members 45L and 45R elastically urging the swing member 36, the tie rods 40L and 40R, etc.

to the positions in the standard state of the vehicle 10 change from the original values, which accumulate elastic energy.

An elastic energy accumulated by the elastic members 45L and 45R is kept constant unless the turning state of the vehicle 10 changes. On the other hand, when the vehicle is rapidly decelerated and rotational speeds of the front wheels 12L and 12R and the rear wheel 14 rapidly decrease in a situation where the vehicle 10 is turning, the gyroscopic moment Mjf acting on the front wheels 12L and 12R and the gyro moment Mjr acting on the rear wheel 14 also decrease sharply. As a result, the accumulated elastic energy is abruptly released, so that the amounts of deformation of the elastic members 45L and 45R sharply decrease so as to become the original value, and the swing member 36 tends to displace upward along the center plane 66 with respect to the vehicle body 24.

Consequently, the vehicle body 24 rapidly displaces upward along the center plane 66, a height of the center of gravity Gm of the vehicle 10 abruptly increases, and a compression deformation amount of the suspension spring 50 abruptly decreases. Accordingly, in a situation where the perpendicular line 84 passing through the center of gravity Gm of the vehicle 10 passes outside the range of the triangle 69 or through a predetermined tolerable margin, even if a target tilt angle θt is decreasingly corrected so that the perpendicular line 84 passes inside the oblique side of the triangle 69 by a distance of the tolerable margin, the perpendicular line 84 may pass through the tolerable margin.

<Adjustment of Lateral Position of Center of Gravity of Vehicle During Turning Deceleration According to Embodiment>

Figure 19:
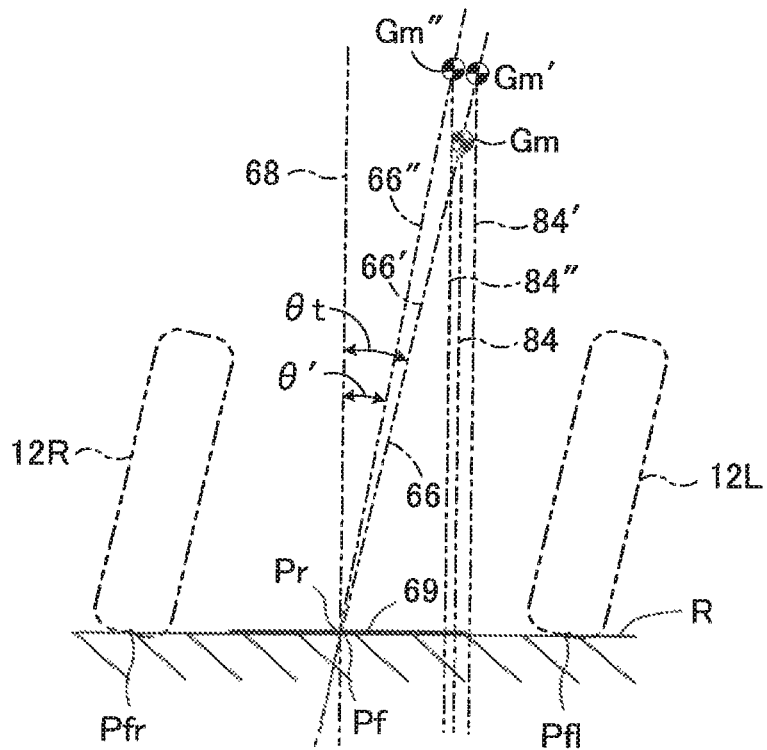
FIG. 19 is a diagram for explaining the action of reducing an amount of movement of the center of gravity of the vehicle toward the turning inner side when the vehicle turns and decelerates.

In the embodiment, as described above, during turning deceleration of the vehicle 10, by controlling a steered angle δr of the rear wheel 14 to zero, a tilt angle θ of the vehicle is reduced to, for example, θ' by effectively using the gyro moment Mjr (see FIG. 19). Accordingly, even when the elastic energy accumulated in the elastic members 45L and 45R is abruptly released and a height of the center of gravity Gm of the vehicle 10 abruptly increases to a position of Gm' at the time of vehicle turning deceleration, it is possible to move the center of gravity to a position of Gm" and reduce an amount of movement of the center of gravity toward the turning inner side. Therefore, it is possible to reduce the possibility that the perpendicular line passing through the center of gravity passes through the predetermined tolerable margin of the triangle 69 as compared to where a steered angle δr of the rear wheel is controlled to a target steered angle δrt.

Although not shown in the drawing, even when the vehicle 10 turns to the right, except that turning inner and outer wheels are opposite to those during left turning of the vehicle, the controllability of a tilt angle of the vehicle at the time of turning deceleration can be improved by the same operation and the possibility can be reduced that a perpendicular line passing through the center of gravity of the vehicle passes through a predetermined tolerable margin of the triangle 69.

Particularly, according to the embodiment, when a deceleration Gxb of the vehicle 10 becomes equal to or larger than the first reference value Gxb1 during the vehicle 10 is in a turning state, a steered angle δr of the rear wheel 14 is controlled to be zero until the deceleration Gxb becomes less than the second reference value Gb2 which is larger than the first reference value Gb1. Therefore, a tilt angle of the vehicle can be reliably reduced to zero during the above-mentioned period and can be brought close to a preferable angle suitable for a running condition of the vehicle.

As described above, since a control current Ir supplied to the steering actuator 62 varies according to a self-aligning torque of the rear wheel, the control current Ir increases as a magnitude of a steered angle δr of the rear wheel increases, and increases as a vehicle speed V increases and decreases as a ground load of the rear wheel decreases. When the ground load of the rear wheel decreases due to deceleration of the vehicle, the self-aligning torque also decreases and the control current Ir also decreases. Therefore, the control current Ir functions as an index value of the ground load of the rear wheel during deceleration of the vehicle.

A self-aligning torque of the rear wheel can be estimated based on a steered angle δr of the rear wheel and a vehicle speed V. If a target steered angle δrt of the rear wheel is used in place of a steered angle δr of the rear wheel, the self-aligning torque of the rear wheel can be estimated without delay, and an apparatus for detecting a steered angle of the rear wheel can be made unnecessary.

According to the embodiment, a control current Ir supplied to the steering actuator 62 is determined based on a target steered angle δrt and a vehicle speed V, and when a control current is equal to or less than a reference current Ir0 determined based on a target steered angle and a vehicle speed, it is determined that a ground load of the rear wheel is lowered. Therefore, it is possible to determine the situation in which a ground load of the rear wheel has decreased without requiring a detection device such as a load sensor for detecting a ground load of the rear wheel and a detection device such as an angle sensor for detecting a steered angle of the rear wheel.

As described above, when an action direction of a gyro moment Mjr acting on the rear wheel 14 is the lateral direction of the vehicle as viewed from above the vehicle, that is, when a steered angle δr of the rear wheel is zero, the effect of reducing a tilt angle θ becomes the largest. Therefore, it is preferable that a steered angle δr of the rear wheel is set to zero.

According to the embodiment, since a steered angle δr of the rear wheel is controlled to be zero, a tilt angle θ of the vehicle can be effectively reduced as compared to where a steered angle δr of the rear wheel is controlled so as to be smaller than a target steered angle δrt and larger than zero. Therefore, the controllability of a tilt angle of the vehicle at the time of turning deceleration can effectively be improved as compared to where a steered angle δr of the rear wheel is reduced to a value smaller than a target steered angle δrt and larger than zero.

Although the present disclosure has been described in detail with reference to the specific embodiment and modification, it will be apparent to those skilled in the art that the present disclosure is not limited to the above-described embodiment and modification, and various other embodiments are possible within the scope of the present disclosure.

For example, in the above-described embodiment, when the vehicle 10 is decelerated in a turning state and a deceleration Gxb of the vehicle becomes the first reference value Gxb1 or more, a steered angle δr of the rear wheel 14 is controlled to be zero until the deceleration Gxb decreases below the second reference value Gb2. However, if a steered angle δr of the rear wheel 14 is made smaller than a target steered angle δrt, a tilt angle θ of the vehicle can be reduced as compared to where a steered angle δr of the rear wheel 14 is controlled to a target steered angle δrt. Therefore, the steering actuator 62 may be controlled such that a steered angle δr of the rear wheel 14 is not controlled to be zero, but is controlled to be a value smaller than a target steered angle δrt.

In the above embodiment, the determination as to whether or not a ground load of the rear wheel 14 has decreased is determined by determining whether or not a control current Ir supplied to the steering actuator 62 is equal to or less than the reference current Ir0. However, a ground load of the rear wheel 14 may be detected by a detection device such as a load sensor, and it may be determined whether or not a ground load of the rear wheel has decreased based on a detection result.

In the above-described embodiment, the actuator 38 is supported so as to be swingable about the pair of pivot shafts 48 provided at the center portion in the longitudinal direction thereof by supporting the pivot shafts 48 by the pair of brackets 46. The output rotary shaft of the actuator 38 protrudes rearward and the boss portion 36B of the swing member 36 is integrally attached to the tip of the output rotary shaft, and the suspension spring 50 and the shock absorber are connected to the front end of the actuator 38 and the vehicle body 24 below the front end.

Figure 20:
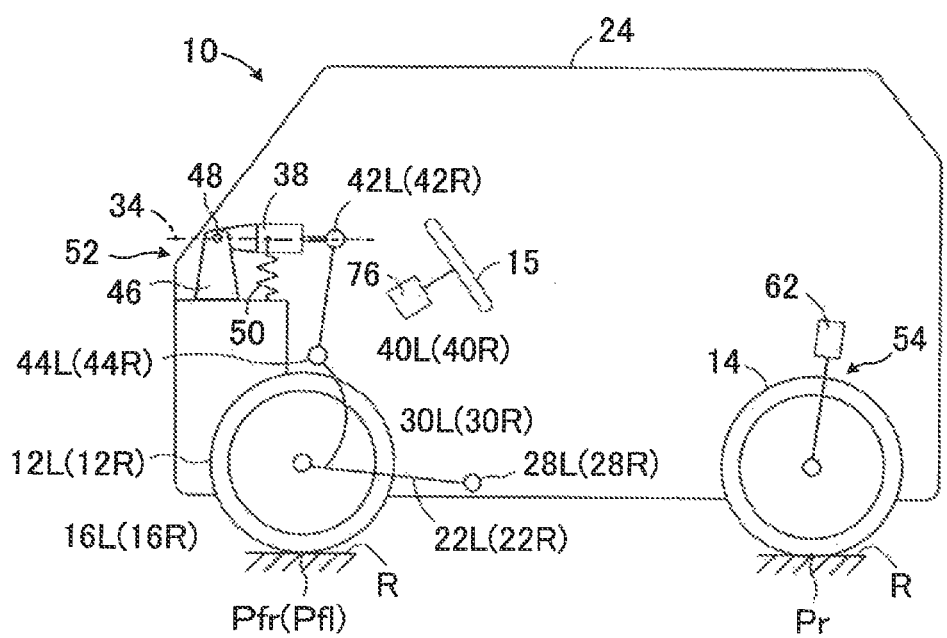
FIG. 20 is a schematic lateral vertical cross-sectional view showing a modified example of the automatic tilting vehicle cut along the center vertical cut plane extending in the longitudinal direction.

However, as shown in FIG. 20, the pivot shafts 48 may be provided at the front end of the actuator 38, the suspension spring 50 and the shock absorber may be interposed between the actuator 38 and the vehicle body 24 on the rear side with respect to the pivot shafts 48 (a first modified embodiment). In that case, since a weight of the vehicle body 24 is supported by a spring force due to an elongation deformation of the suspension spring 50, the suspension spring 50 may be an elastic member such as a tension coil spring, for example. When the rear portion of the actuator 38 is moved downward with respect to the vehicle body 24 due to the gyro moments acting on the front wheels, a height of the vehicle body 24 is reduced due to a reduction in an amount of extension deformation of the suspension spring 50.

Further, the positional relationship of the swing member 36, the suspension spring 50, and the shock absorber in the longitudinal direction with respect to the pivot shafts 48 of the actuator 38 may be opposite to the relationship in the above embodiment. That is, the actuator 38May be disposed behind the vehicle tilting device 18, the boss portion 36B of the swing member 38 may be integrally attached to the output rotary shaft that projects forward, and the suspension spring 50 and the shock absorber may be interposed between the rear end of the actuator 38 and the vehicle body 24. Furthermore, the positional relationship of the swing member 36, the suspension spring 50 and the shock absorber in the longitudinal direction with respect to the pivot shafts 48 of the actuator 38 may be opposite to the relationship in the above-described first modified embodiment.

Further, the actuator 38May be supported by the vehicle body so as to move up and down with respect to the vehicle body 24 without oscillating (a second modified embodiment). In that case, a suspension spring 50 such as a compression coil spring may be interposed between the actuator 38 and the vehicle body member above the actuator, or a suspension spring 50 such as a tension coil spring may be interposed between the actuator 38 and the vehicle body member below the actuator.

In the above-described embodiment, the effective lengths of the tie rods 40L and 40R, that is, the distances between the pivot points Par and Pal and the pivot points Pbr and Pbl, respectively are smaller than the distances between the pivot points Pbr and Pbl and the grounding points Pfr and Pfl, respectively. However, the effective lengths of the tie rods 40L and 40R may be greater than the distances between the pivot points Pbr and Pbl and the grounding points Pfr and Pfl, respectively. The relationships between the effective lengths of the tie rods 40L and 40R and the distances between the pivot points Pbr and Pbl and the grounding points Pfr and Pfl with respect to the effective lengths of the arm portions 36AL and 36AR may be different from the illustrated relationships.

Further, in the above-described embodiment, the arm portions 36AL and 36AR of the swing member 36 are formed in a straight line without being inclined to each other and extend horizontally when the vehicle 10 is in the standard state. However, the arm portions 36AL and 36AR may be V-shaped so that their heights increase as the distances from the boss portion 36B increase or conversely, may have an inverted V shape so that the height decreases as the distance from the boss portion 36B increases.

Further, in the above embodiment, the lower ends of the tie rods 40L, 40R are connected to the knuckles 16L, 16R via the knuckle arms 30L, 30R and the suspension arms 22L, 22R, respectively. However, the knuckle arms 30L, 30R may be integrally connected at the lower ends to the knuckles 16L, 16R, respectively. Furthermore, the knuckle arms 30L, 30R may be omitted, and the tie rods 40L, 40R may be pivotally attached at the lower ends to the knuckles 16L, 16R, respectively.

Further, although in the above embodiment, there is only one rear wheel, two rear wheel with a smaller tread than the left and right front wheels may be provided, and the rear wheel may also be a drive wheel.

What is claimed is:

1. An automatic tilting vehicle which includes a pair of laterally spaced front wheels, a rear wheel configured to be steered by a steering actuator, a vehicle tilting device, and a control unit; each front wheel is rotatably supported by a corresponding knuckle; the vehicle tilting device includes a swing member that swings about a swing axis extending in the longitudinal direction of the vehicle, a tilt actuator that swings the swing member about the swing axis, and a pair of tie rods pivotally attached to the swing member at upper end pivoting portions on both lateral sides of the vehicle and coupled to corresponding knuckles at lower end coupling portions; the tilt actuator is coupled to a vehicle body via a suspension spring; the control unit is configured to calculate a target steered angle of the rear wheel based on a steering operation amount of a driver and a vehicle speed and to control the steering actuator so that a steered angle of the rear wheel becomes the target steered angle; further, the control unit is configured to calculate a target lateral acceleration of the vehicle based on a steering operation amount of the driver and a vehicle speed, to calculate a target tilt angle of the vehicle based on the target lateral acceleration of the vehicle, and to tilt the vehicle to a turning inner side by controlling the tilt actuator such that a tilt angle of the vehicle becomes the target tilt angle, wherein
the control unit is configured to control the steering actuator such that when it is determined that the vehicle is turning and a ground load of the rear wheel is decreased due to deceleration of the vehicle, a steered angle of the rear wheel becomes smaller than the target steered angle.

2. The automatic tilting vehicle according to claim 1, wherein the control unit is configured to control the steering actuator so that, when a deceleration of the vehicle becomes equal to or higher than a first reference value, a steered angle of the rear wheel becomes smaller than the target steered angle until a deceleration of the vehicle becomes less than a second reference value smaller than the first reference value.

3. The automatic tilting vehicle according to claim 1, wherein the steering actuator is an electric actuator, and the control unit is configured to determine that a ground load of the rear wheel has decreased when a control current supplied to the steering actuator is equal to or less than a reference current determined based on the target steered angle and a vehicle speed.

4. The automatic tilting vehicle according to claim 1, wherein the control unit is configured to control the steering actuator so that a steered angle of the rear wheel becomes zero when it is determined that the vehicle is turning and a ground load of the rear wheel is decreased due to deceleration of the vehicle.

5. The automatic tilting vehicle according to claim 2, wherein the control unit is configured to control the steering actuator so that a steered angle of the rear wheel becomes zero when it is determined that the vehicle is turning and a ground load of the rear wheel is decreased due to deceleration of the vehicle.

6. The automatic tilting vehicle according to claim 3, wherein the control unit is configured to control the steering actuator so that a steered angle of the rear wheel becomes zero when it is determined that the vehicle is turning and a ground load of the rear wheel is decreased due to deceleration of the vehicle.

\* \* \* \* \*